(12) United States Patent
Doss et al.

(10) Patent No.: US 7,395,221 B2
(45) Date of Patent: Jul. 1, 2008

(54) INTELLIGENT FREE-TIME SEARCH

(75) Inventors: J Smith Doss, Raleigh, NC (US); Renee M. Kovales, Cary, NC (US); Diane P. Pozefsky, Chapel Hill, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1193 days.

(21) Appl. No.: 10/141,737

(22) Filed: May 9, 2002

(65) Prior Publication Data
US 2004/0093290 A1    May 13, 2004

(51) Int. Cl.
G06F 9/46      (2006.01)
(52) U.S. Cl. .......................................... 705/9
(58) Field of Classification Search ............... 705/8, 705/9
See application file for complete search history.

(56) References Cited

U.S. PATENT DOCUMENTS

| | | | |
|---|---|---|---|
| 5,848,403 A | | 12/1998 | Gabriner et al. |
| 5,943,652 A | * | 8/1999 | Sisley et al. ............... 705/9 |
| 6,101,480 A | | 8/2000 | Conmy et al. |
| 6,457,062 B1 | | 9/2002 | Pivowar et al. |
| 6,578,005 B1 | | 6/2003 | Lesaint et al. |
| 6,640,230 B1 | | 10/2003 | Alexander et al. |
| 7,035,865 B2 | | 4/2006 | Doss et al. |
| 7,188,073 B1 | | 3/2007 | Tam et al. |
| 2001/0014867 A1 | * | 8/2001 | Conmy ........................ 705/9 |
| 2002/0029161 A1 | | 3/2002 | Broderson et al. |
| 2002/0131565 A1 | * | 9/2002 | Scheuring et al. ........ 379/88.19 |
| 2003/0014491 A1 | | 1/2003 | Horvitz et al. |
| 2003/0149605 A1 | | 8/2003 | Cragun et al. |
| 2003/0149606 A1 | | 8/2003 | Cragun et al. |

FOREIGN PATENT DOCUMENTS

JP         09-198439 A  *  7/1997

OTHER PUBLICATIONS

Lin, C.K.Y., Microcomputer-based workforce scheduling for hospital porters, Journal of Management in Medicine, 1999 v13n4, pp. 251, Dialog 02405180 116360139.
Khamooshi, Homayiun, Network-based project planning and scheduling, Industrial Management + Data Systems, 1996, v96n8 pp. 13, Dialog 02398030 117542172.

(Continued)

*Primary Examiner*—Susanna M Diaz
(74) *Attorney, Agent, or Firm*—Marcia L. Doubet; Andre M. Gibbs

(57) ABSTRACT

Techniques are disclosed for performing free-time searches that exploit information of the type used with electronic calendars. By leveraging advanced calendaring system information and using location, other context information such as corporate policy, legal constraints, and technology constraints, and user-specific preferences to provide a complete picture of a person's availability, the functionality (and therefore the value) of scheduling systems in increased, resulting in an ability to schedule meetings with more accuracy and less rework. Various allowable participation types for meeting invitees may be specified, and each invitee's availability is determined accordingly. Location-sensitive travel times (including optional user-specific travel time adjustments) are used in preferred embodiments when in-person participation is required.

10 Claims, 12 Drawing Sheets

OTHER PUBLICATIONS

Johansen, Steve, "Groupware and Collaborative Systems - A Big Picture View", (C) 1989 IEEE, pp. 1217-1220.

Giffin, Steven D., "Analysis of the Suitability of Internet Applications for different types of Communication in the Context of Project Management", Jan. 31, 2002, PhD Thesis Abstract, George Washington University, pp. 1-4.

Tyran, Craig K.; Shepherd, Morgan, "Collaborative Technology in the Classroom: A Review of the GSS Research and a Research Framework", Oct. 2001, Information Technology and Management, 2, 4; ABI/INFORM Global, pp. 395-418.

Salopek, Jennifer, "Digital Collaboration", (c) 2001 Gale Group, retrieved from BNET.com, pp. 1-5.

* cited by examiner

FIG. 1

INTELLIGENT FREE-TIME SEARCH

RELATED INVENTIONS

The present invention is related to the following commonly-assigned U. S. Patents: U.S. Pat. No. 6,988,128, titled "Calendar Events and Calendar-Driven Application Technique" (Ser. No. 09/670,844); U.S. Pat. No. 6,640,230, titled "Calendar-Driven Application Technique for Preparing Responses to Incoming Events" (Ser. No. 09/671,001); U.S. Pat. No. 7,035,865, titled "Calendar-Enhanced Awareness for Instant Messaging Systems and Electronic Status Boards" (Ser. No. 09/941,045); and U.S. Pat. No. 7,096,232, titled "Calendar-Enhanced Directory Searches Including Dynamic Contact Information" (Ser. No. 09/875,556). The disclosures of these related inventions are hereby incorporated herein by reference.

BACKGROUND OF THE INVENTION

1. Field of the Invention

The present invention relates to a computer system, and deals more particularly with methods, systems, and computer program products for performing intelligent free-time searches (for example, to improve scheduling of meetings) of information such as that used with electronic calendars.

2. Description of the Related Art

Calendars, and electronic calendars in particular, often contain a wealth of information about their owner. For example, an individual may use an electronic calendar to maintain information about his work schedule, his meetings and other appointments, his vacation and business travel plans (including when he will be away, which flights or other transportation he will use, where he can be reached while away, who he may visit while away, etc.), phone calls that need to be made at particular times, and so forth. Examples of electronic calendaring systems include Microsoft Outlook® 2000 and Lotus Notes®. ("Outlook" is a registered trademark of Microsoft Corporation, and "Lotus Notes" is a registered trademark of Lotus Development Corporation.)

Use of electronic calendaring systems for purposes such as scheduling meetings of multiple persons is known in the art. For example, an invitation list may be created for a particular meeting, and a calendaring software application may then use this list to check each invitee's calendar for available time periods. A meeting may then be scheduled during a time period in which all (or some majority) of the invitees have sufficient time available on their calendar. However, prior art scheduling capabilities in calendaring systems have limitations which can render them ineffective in many scenarios. In particular, scheduling meetings between multiple people using prior art techniques is typically a time-consuming task that often involves many iterations. It may either fail to accommodate considerations beyond rudimentary duration requirements or may require significant manual input to handle such considerations, or it may find only unacceptably late dates.

Scheduling capability in prior art electronic calendaring systems, when present, is typically limited to a rudimentary "free-time search" which only looks for blocks of free time on the users' calendars. However, using just free time may generate results that are too constrained in some scenarios or results that are not constrained enough in other scenarios. As an example of results that are too constrained when based solely on free time, it may be acceptable for a particular meeting to have one or more of the invitees participate by phone (rather than requiring them to be present in person); these invitees might be willing to call in to the meeting from their cell phones while they are commuting, or they might be willing to call in after normal business hours, or from an alternate work location or travel destination. For these cases, the person's calendar would ordinarily indicate that they are in an "unavailable" status of one type or another (that is, the commuting, after hours, at alternate work location, or traveling status would not be recognized as "free time" in which meetings could be scheduled). As an example of results that are not sufficiently constrained when based solely on free time, it may happen that some invitees need to be present at the meeting in person, in which case the location of the person is important (in terms of their ability to get to the meeting location), not just whether there is free time on the person's calendar.

The following scenarios illustrate various factors that are not addressed by prior art calendaring systems or their scheduling capabilities. (These calendaring systems and search capabilities are referred to herein generally as "prior art systems".)

Scenario 1: Prior art systems do not understand nuances related to the physical location of the invitees. Suppose, for purposes of illustration, that Joe works at the Research Triangle Park ("RTP") site of International Business Machines Corporation ("IBM"), where this RTP site comprises many buildings, some of which are in close physical proximity to each other but others of which are located several miles away. Further suppose that Joe wants to schedule a one-hour, in-person meeting with ten other people who are also located at the RTP site. Joe may use a prior art free-time search capability to search the electronic calendars for the invitees to find one hour where all ten meeting invitees are available. Assuming that all ten people have a common one-hour period available, this time period is selected, and programmatically generated meeting invitations are sent electronically to each invitee. Upon receiving their invitation, several of the invitees decline the invitation because they are located in buildings from which travel time will be required to get to and from the meeting, and they have events already scheduled on either side of the new meeting which prevent their being able to arrive at the next meeting on time. Joe did not manually factor this consideration into the schedule for this meeting, and the prior art free-time search does not have this capability. So, Joe must now find a different hour when everyone can meet, and must also factor in the various travel times for those people who he determines will have to travel. This is a time-consuming effort that requires Joe to not only know the locations of every invitee before and after the proposed meeting and the time it takes to move between these locations and the meeting location, but to also use a combination of free-time search, manual calendar search, and contacting people directly before he can find an appropriate time for the meeting.

There might be other criteria to consider as well, further complicating the scheduling process. For example, some individuals may have travel constraints (such as "Betty participates in a car pool on Tuesdays and Thursdays and therefore has no car") which prevent them from being able to travel to a meeting at another location.

Scenario 2: Prior art systems do not understand availability beyond simple free time. Suppose now that Joe needs to schedule a one-hour "e-meeting" with Elaine. (An e-meeting may use technology such as Lotus Sametime® or Microsoft's NetMeeting®, which allow people to hold "face-to-face" conversations over the Internet from their computing device. "Sametime" is a registered trademark of Lotus Development Corporation, and "NetMeeting" is a registered trademark of Microsoft Corporation.) Elaine has many events on her calendar, including an out-of-town business trip scheduled for the current week (with meetings scheduled every afternoon), all-day workshops the next week, and vacation the following week. Therefore, when Joe uses a prior art free-time search to search her calender for one hour of free time, he finds that Elaine won't be available for three weeks. Joe gives up using the automated scheduling system, and calls Elaine's secretary who informs him that Elaine is actually available any morning during her business trip for a one-hour e-meeting. Joe could not determine this by simply looking at Elaine's calendar, and the prior art free-time search is not programmed with this capability.

Scenario 3: Prior art systems do not understand constraints of particular locations and/or policies that impact a person's availability. Suppose that Joe needs to talk to Fred, who travels from one customer site to another in a five-state region. Joe looks at Fred's calendar, and decides to schedule a call during a time in which Fred is scheduled to drive from one customer location to another. What Joe doesn't understand from merely inspecting the entries on Fred's calendar is that Fred will be driving in a state that prohibits cell phone calls while driving. Thus, Joe schedules the meeting, only to learn that it has to be rescheduled. Using the prior art free-time search to find time on Fred's calendar would have not helped in this situation: the automated search would be impaired by the same missing information that Joe needed when manually inspecting Fred's calendar.

In another aspect of this scenario, if the meeting is to discuss confidential topics and corporate policy prohibits discussing confidential information over cell phones, then Joe would need to understand this and not schedule the call while Fred is driving (or during other times when Fred is reachable only by cell phone).

Scenario 4: Prior art systems do not understand capabilities/limitations of various technologies. In yet another aspect of the scenario described above, where Joe wants to reach Fred by cell phone, it might happen that Fred is traveling through a location that allows cell phone calls while driving, provided the cell phone is operated in a "hands-free" mode. Before he could successfully schedule a call with Fred, Joe would have to understand not only where Fred would be at the selected time and any applicable constraints of that location, but also the capabilities of Fred's phone.

Scenario 5: As another example of technology-related constraints, suppose that Joe needs to set up an e-meeting with Barney. Further suppose that Barney is working from home today, according to his calendar. Joe has a high-speed connection in his office, and assumes that everyone else has similar capabilities, so he decides to set up the meeting for today. Barney, however, has a low-speed connection at home. The e-meeting is a disaster, due to the slow line speed.

Scenario 6: Prior art systems do not understand nuances of blocked time, such as time periods marked as having a "local travel" status. Suppose that Joe is trying to schedule a meeting with Wilma at noon in Building number 500. Wilma is in this building from 11 a.m. to noon, according to her calendar, and then has "local travel" scheduled on her calendar from noon until 12:15, giving her time to drive back to her office which is located several miles away in another building. The prior art free-time search would not show that Wilma is actually available at noon in Building number 500.

Accordingly, what is needed are improved scheduling/searching techniques, where these improved techniques consider factors beyond availability of free-time segments on a user's calendar.

SUMMARY OF THE INVENTION

An object of the present invention is to provide improved techniques for performing free-time searches of availability information.

Another object of the present invention is to provide these improved techniques by considering factors beyond availability of free-time segments on a user's calendar.

Another object of the present invention is to provide improved scheduling techniques.

It is a further object of the present invention to provide improved techniques for analyzing electronic calendar entries and associated calendar data.

Yet another object of the present invention is to make electronic calendars more useful.

Still another object of the present invention is to define extensions to electronic calendar systems that can be leveraged for improved searching.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides systems, methods, and computer program products for improving free-time searches and scheduling. In one aspect, this technique comprises: programmatically scheduling a meeting by evaluating, for each invitee of the meeting, calendar data of an electronic calendar to determine each invitee's availability for attending the meeting in one or more allowable participation types; and then scheduling the meeting at a time and location where the invitees are determined to be available for the allowable participation types. The evaluation may further comprise applying factors such as a particular invitee's user-specific preferences and/or corporate policy considerations to determine whether the particular invitee is available for attending the meeting in one or more allowable participation types for this particular invitee. Such factors may also be used to determine whether a particular meeting location is available for scheduling the meeting. Each meeting invitee may have a plurality of allowable participation types, in which case the scheduling of the meeting preferably further comprises scheduling the meeting at a time and location where each invitee is determined to be available for at least one of his/her allowable participation types.

In another aspect, the techniques of the present invention comprise performing a free-time search of calendar data by: retrieving availability information for a plurality of users; locating free-time segments which are available in the retrieved availability information; adjusting the located free-time segments based on one or more context-sensitive criteria which are applicable to this free-time search; determining one or more free-time segments when each of the plurality of users is available, according to the adjusted free-time segments for each of the users; and providing the determined free-time segments as a result of the free-time search. The retrieved availability information preferably comprises calendar data from the users' electronic calendars.

In yet another aspect, the techniques of the present invention comprise programmatically scheduling an event for a plurality of users by: retrieving availability information for a plurality of users; locating free-time segments which are available in the retrieved availability information; adjusting the located free-time segments based on one or more context-sensitive criteria which are applicable to the event being scheduled; determining one or more free-time segments when each of the plurality of users is available, according to the adjusted free-time segments for each of the users; and providing the determined free-time segments as candidate times for scheduling the event.

The context-sensitive criteria preferably comprise one or more of: user preferences of one or more users; policy considerations; legal constraints; location constraints; technology constraints; and device constraints.

The adjusting process preferably further comprises: analyzing located free-time segments in one or more busy bars for each of the users; and marking a particular one of the analyzed free-time segments as a busy-time segment if the context-sensitive criteria indicate that this user is not actually available during this particular time segment. The adjustments may be made for each user's retrieved availability information in view of one or more allowable participation types for that user. If the participation type allowed for a particular user is in-person participation in the event, then marking free-time segments as busy-time segments is performed if the context-sensitive criteria indicate that the particular user is not available for in-person participation during the selected time segment. For in-person participation, travel time is computed as part of the process, and the travel time between locations may be obtained in a number of ways. User-specific adjustments may optionally be applied to the computed travel time. The travel time may represent more than one mode of travel.

In still another aspect, the techniques of the present invention comprise scheduling a meeting by: selecting one or more meeting invitees; selecting, for each invitee, an allowable participation level; evaluating availability information for each invitee, with reference to the allowable participation level; and using results of the evaluation for all invitees to determine when the meeting can be scheduled. The allowable participation level for each invitee may be a minimum required participation level, in which case the evaluation process evaluates the availability information for each invitee for the minimum required participation level and for zero or more higher-ranking participation levels which are implied by the minimum required participation level. Or, the selection may be of one or more explicitly-specified participation levels for each invitee, in which case the evaluation process evaluates the availability information for each invitee for each of the one or more explicitly-specified participation levels of that invitee.

One or more candidate meeting times may be determined when all invitees are available according to the evaluation process. A meeting location supplied by a meeting scheduler may be considered as a constraint on when the meeting can be scheduled. One or more meeting preferences supplied by the meeting scheduler might additionally, or alternatively, be considered in determining when the meeting can be scheduled.

The results of the evaluation are preferably presented to a meeting scheduler, who may then select from among a plurality of potential times and/or locations in the presented results. Meeting invitations may then be sent automatically to the invitees, wherein the meeting invitations specify the selected time and location. The meeting invitations may further specify travel time to and/or from the selected location for those invitees for whom in-person participation is an allowable participation level, and may specify one or more allowable participation levels for each meeting invitee.

The present invention will now be described with reference to the following drawings, in which like reference numbers denote the same element throughout.

BRIEF DESCRIPTION OF THE DRAWINGS

FIG. 1 provides a sample graphical user interface ("GUI") display which may be used to enter scheduling criteria, according to the present invention;

DESCRIPTION OF PREFERRED EMBODIMENTS

Figure 2:
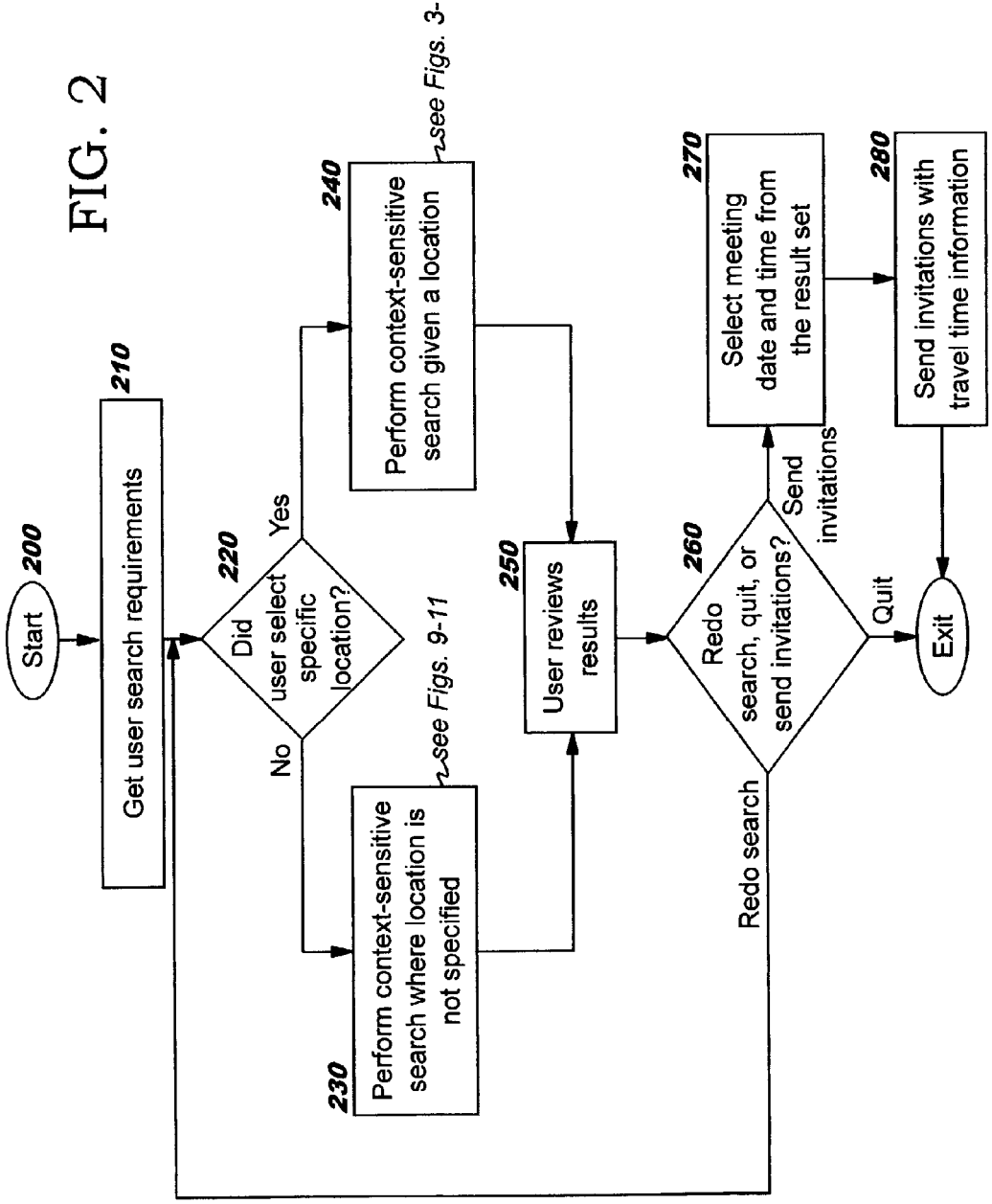
FIG. 2 provides an overview flow chart which sets forth logic that may be used when implementing preferred embodiments of the present invention.
Figure 3:
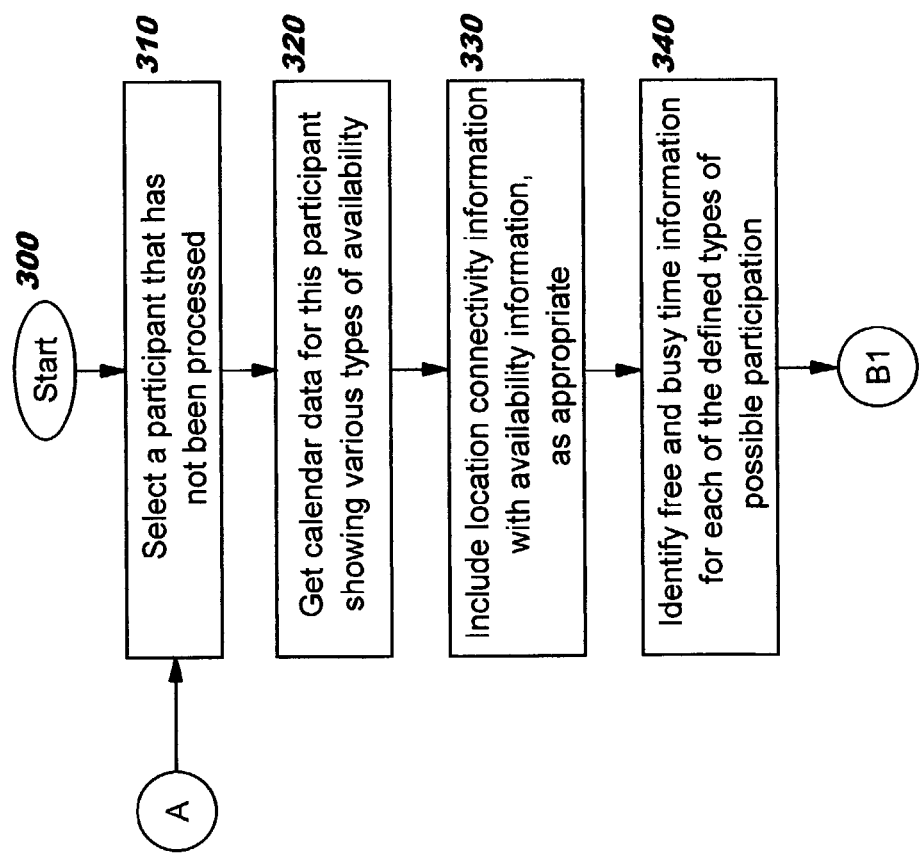
FIGS. 3-7 illustrate flow charts which set forth logic that may be used to implement free-time searches for scheduling a meeting in a particular location, according to preferred embodiments of the present invention.

The present invention defines improved techniques for finding common free time, where this common free time is described herein with reference to scheduling meetings among calendar owners using information of the type used by electronic calendars. The disclosed techniques provide more intelligent searching of calendar data, resulting in improved calendar-based scheduling; thus, the terms "searching" and "scheduling" may be used interchangeably when describing advantages of the present invention. (While the discussions herein presume that a person's availability information comes from electronic calendar data, this is for purposes of illustration and not of limitation. The actual origin of the availability data may be different, without deviating from the scope of the present invention. Furthermore, preferred embodiments are described herein with reference to scheduling meetings. However, the disclosed techniques may be adapted to other uses, including but not limited to scheduling other types of events, and such other uses are considered within the scope of the present invention.)

The term "calendar data" is used herein to describe information of the type used by electronic calendars, which preferably comprises calendar entries as well as other information such as the calendar owner's working hours, the time zone for a particular calendar, and preferences that, for example, could indicate how a calendar owner's calendar entries should be interpreted and/or could provide schedules for when devices such as cell phones or pagers could be used.

The present invention defines techniques whereby the search for free time overcomes limitations of the prior art. In preferred embodiments, an implementation of the present invention is adapted for understanding (i.e., for programmatically analyzing) not only calendar data but also nuances related to the physical location of the invitees; availability beyond simple free time; constraints of particular locations and/or policies/laws/regulations that impact a person's availability; capabilities/limitations of various technologies that impact a person's availability; and nuances of blocked time. Preferred embodiments also account for individual preferences and user-specific constraints, as will be described in more detail herein. Relationships among physical locations, such as distances between various locations and travel time from one location to another, are factored into the scheduling process in preferred embodiments. Using these various types of information, referred to herein as "contextual" information or "context-sensitive information", embodiments of the present invention intelligently find free time that meets real-world scheduling considerations.

Alternative embodiments may omit consideration of policies, laws, regulations, and/or technology-based constraints without deviating from the scope of the present invention.

Prior to performing a context-sensitive free-time search using an implementation of the present invention, several different types of information that will be leveraged in the searching process need to be set up and available. In preferred embodiments, the following components must be available: (1) a location database; (2) a means of estimating travel time; (3) a policy database; (4) a user preferences database; (5) information of the type used by an advanced calendaring system; and (6) means for determining the location of scheduled calendar events. (Alternative embodiments may omit one or more of these databases, and additional databases with other constraints could be included in the search considerations.) While the discussion herein refers to information residing in separate databases, it may be stored in fewer databases or may be stored in other repositories (such as a set of tables). Furthermore, while preferred embodiments are described with reference to use of databases, this is merely for illustrative purposes: services (including one or more commercially-available services) might be invoked for retrieving one or more of these types of information; in addition, the information may be in a more sophisticated form than what is described herein. As an example, rather than retrieving statically-stored travel time from a database or computing a travel time estimate based on the geographical distance between two points, an implementation of the present invention might alternatively contact a travel time service that dynamically computes travel time and which may also incorporate additional factors such as the impact of rush-hour traffic (where such a service is adapted for determining the appropriate rush-hour information, such as times of day and locations for which rush hour is a concern, the amount of delay to add, and so forth). Each of the above-mentioned components will now be described in more detail.

A location database comprising information about sites (and/or locations) is preferably created by the enterprise hosting the free-time search service. A "site", as the term is used herein, refers to a set of locations that a person may commonly and easily commute between. For example, the term "the RTP site" is used herein to signify a collection of buildings located in Research Triangle Park, N.C. The location database may be organized (e.g., subdivided) according to the locations comprising the physical site. In the general case, the locations within a site could include office buildings and/or other work areas (such as construction areas, airports, hotels, and restaurants). An enterprise may have numerous sites, in which case the location database is preferably organized according to site within enterprise and location within site; or, separate location databases might be used for each site. Typically, a systems administrator will create and populate the location database.

Information stored in the location database for each location preferably includes the physical coordinates of the location (such as the latitude and longitude where a building is located), which may be used to compute distances between locations, and/or a set of tuples specifying the distance or travel time between each pair of locations in the database.

The location database preferably includes a listing of meeting rooms (which may include individual office locations), conference rooms, video conference rooms, or other types of facilities (where these terms are used interchangeably herein) in each building/location, and may also include location-specific facility-related constraints. Examples of these constraints include the number of people each meeting room can accommodate, whether (and, optionally, in what ways) the meeting room meets requirements of the physically challenged, technology constraints such as the speed of a network connection that is available from the meeting room, device availability in this meeting room, whether this meeting room is acceptable for discussing the meeting subject matter, and so forth. (While meetings are described herein primarily in terms of being held in an enterprise's on-site facilities, this is merely for purposes of illustration. Other locations such as public restaurants or conference centers might be used alternatively. As an example of location-related constraints that may apply to a particular location, the discussion of confidential information may be prohibited in a restaurant or other public location.)

A means of estimating travel time is leveraged for determining whether persons who must attend a meeting in person will have sufficient time to get to the meeting and/or to get to a meeting which follows the meeting being scheduled. One example of how travel time estimates may be provided is to create a set of tuples which statically specifies the estimated travel time between each pair of locations in the location database, as mentioned earlier. Optionally, the preferred travel means between locations may also be included. For example, walking might be indicated as the preferred travel means between two relatively close buildings, whereas car travel might be indicated for longer distances or for routes which are unsafe for pedestrians. Another example of how travel time estimates may be provided is to base the estimated time on the location-to-location distance tuples in the location database. Alternatively, the estimate of travel time could be derived, for example, from a mapping service such as those which are commercially available for generating driving directions from one address/location to another.

In addition to building-to-building travel time estimates, within a large physical space such as a large office building, internal travel time (such as an estimated walking time) could also be estimated between offices based on the distance between the offices.

Embodiments of the present invention are preferably adapted for computing the complete travel time that will be required for a particular person to get to a meeting. For example, rather than computing only driving time between two places, factors such as the length of time that will be required for the person to park her car in a parking lot, then walk to the building in which the meeting is being held, and then walk to the meeting room (and/or, as appropriate for a particular meeting, the time to perform such activities upon leaving the meeting) are also preferably included in the travel time estimates. In large physical spaces, these additional activities may add a considerable amount of time to the overall travel estimate. It may happen that some people may require more time for these types of activities than other people require. Preferably, user preferences (described below) are used to specify how travel time estimates should be adjusted on a per-user basis.

The discussions herein assume that a person is willing and able, unless otherwise indicated in his/her preference settings, to travel between locations within a site. With additional preference settings and the addition of site-to-site travel time information, which could be a combination of static data and derived data (derived, for example, from airline or train schedules, and preferably also considering travel-related factors such as the time required to park and be transported from the parking lot, the time required to check in for the trip, the time spent retrieving luggage upon arrival, and so forth), the travel time considerations may be extended to include site-to-site travel.

A policy database may be set up by the enterprise hosting the improved free-time search service disclosed herein. This policy database might contain policy statements such as:

Do not hold business meetings in employee homes.
Do not take part in a confidential meeting via cell phone.
Do not use a cell phone while driving.
Do not take part in confidential meetings in public locations.

As briefly discussed earlier, legal (or regulatory) considerations may also affect a person's availability for meeting participation. Thus, the policy database (or a separate database) could provide legal constraints, such as whether cell phone conversations are allowed while driving. Legal considerations may optionally be associated with fixed geographic boundaries.

A database is preferably provided to record user preferences or user-specific constraints/policies. (The term "user preferences" should be construed as referring also to user-specific constraints and policies, such as "Betty can't travel to meetings on the days she rides in the car pool".) For a particular user, these preferences could be specified using the calendar application or by another means. In this user preferences database, the user may be allowed to define additional locations, such as his home or office, and may define preferences and constraints for those locations. For example, Fred may define his office as a meeting location, and may specify constraints such as how many people can be accommodated for meetings in this office, etc.

Optionally, technology-related information such as device availability or connectivity information may be specified for each user-added location (as well as for the user's normal work location). For example, Joe might specify that he has a high-speed connection when he is at his primary home, but only a low-speed connection while at his beach condominium and that he will not have any network connectivity at all when his scheduled calendar event is "on vacation". Travel time from a user-added location to one or more of the locations defined in the location database may be statically specified, or travel time may be estimated using one (or more) of the techniques described above when discussing means of estimating travel time.

In addition, the user could specify personal preferences such as:

I prefer afternoon meetings.
If I have to travel between locations, I prefer having the meeting at the beginning (or the end) of the day.
All meetings have to be in my office complex, i.e., locations I can walk to (for a person without a car or other means of transportation).
If working at home, I am not available for in-person meetings.
Add 10 minutes to all corporate-provided travel time estimates.

User preferences may also be used to specify device-related information for this invitee, such as the fact that Wilma's cell phone allows hands-free operation. (This may be significant, for example, where local law or corporate policy forbids use of cell phones while driving unless the phone can be operated in hands-free mode.) Alternatively, this type of device-specific information might be stored in a different repository. For example, Wilma might have preferences information specific to her car or other location, where this type of device-related information may be stored.

Information of the type used in an advanced calendaring system is required, where this information can be used to derive a schedule of when a person is available via different means such as in person, by telephone, or using some other communication means. Embodiments of this type of advanced calendaring system are disclosed in the aforementioned related U.S. Patents. U.S. Pat. No. 6,988,128 (Ser. No. 09/670,844) discloses techniques for analyzing information in calendar entries (along with optional preference data) when an incoming event occurs (such as an incoming e-mail message or voice message, or a request for project management status information). The analysis determines availability (and/or other information) of the calendar owner, and programmatically generates a response to the incoming event. For example, if an e-mail message arrives while the recipient's calendar indicates that she is on vacation, a message can be returned immediately to notify the sender that the message recipient is away (and will therefore not be sending a quick personal response). U.S. Pat. No. 6,640,230 (Ser. No. 09/671,001) teaches preprocessing calendar events, creating a table or other repository having entries which represent a calendar owner's distinct types of status within a particular time period. Upon receiving an incoming event, this stored data can be inspected to determine an appropriate programmatic response. A combination of on-demand (i.e., event-driven) generation and preprocessing may also be used (for example, to verify that previously-generated information is still current).

U.S. Pat. No. 7,035,865 (Ser. No. 09/941,045) discloses enhancements to an advanced calendaring system whereby instant messaging systems and electronic status boards are preemptively notified of status changes for a defined set of users, and whereby recipients of status information can request retransmission and optionally acknowledge receipt thereof. U.S. Pat. No. 7,096,232 (Ser. No. 09/875,556) discloses techniques whereby calendar data can be analyzed to discern availability of a person or group of people for various types of contact (for example, when they are next available by phone, e-mail, in person, and so forth).

Enhancements to the data described in the related inventions are needed, whereby clearly-defined (i.e., machine-processable) physical location information or a reference thereto is stored with (or otherwise associated with) individual calendar events. A calendar user interface is preferably provided to allow a calendar owner to specify this location information on his/her calendar entries. This could be free-form text (similar to the free form text allowed in prior art calendar entries). As another approach, the user could be provided with options such as using a pulldown list of known sites for the hosting enterprise, a selection from which would then tailor a second pulldown having choices of the known locations at that site. As still another approach, a single-level pulldown menu might be used, or the user might type in physical address information (such as latitude and longitude values, the nearest intersection or cross streets, the location's street address, etc.). Optionally, filtering may be applied before displaying choices in a pulldown menu, such that only locations that are acceptable according to constraints of each particular calendared event are provided. (For example, if a meeting is scheduled and the meeting location must be wheelchair-accessible, then any meeting facilities not meeting this requirement may be omitted from the display by using a filtering operation.)

Given the above information, a user can perform a context-sensitive free-time search using multi-dimensional search criteria, as described in detail herein, corresponding generally to the type of detailed instructions that a person might give to an administrative assistant for performing a labor-intensive manual scheduling process of the prior art. The multi-dimensional, context-sensitive search supported by embodiments of the present invention is in contrast to current state-of-the-art meeting scheduling systems, which allow the user to enter the names of the participants and possibly a suggested meeting time (and, in some prior art systems, whether a meeting room needs to be reserved). The manner in which preferred embodiments operate will now be described.

Figure 1:
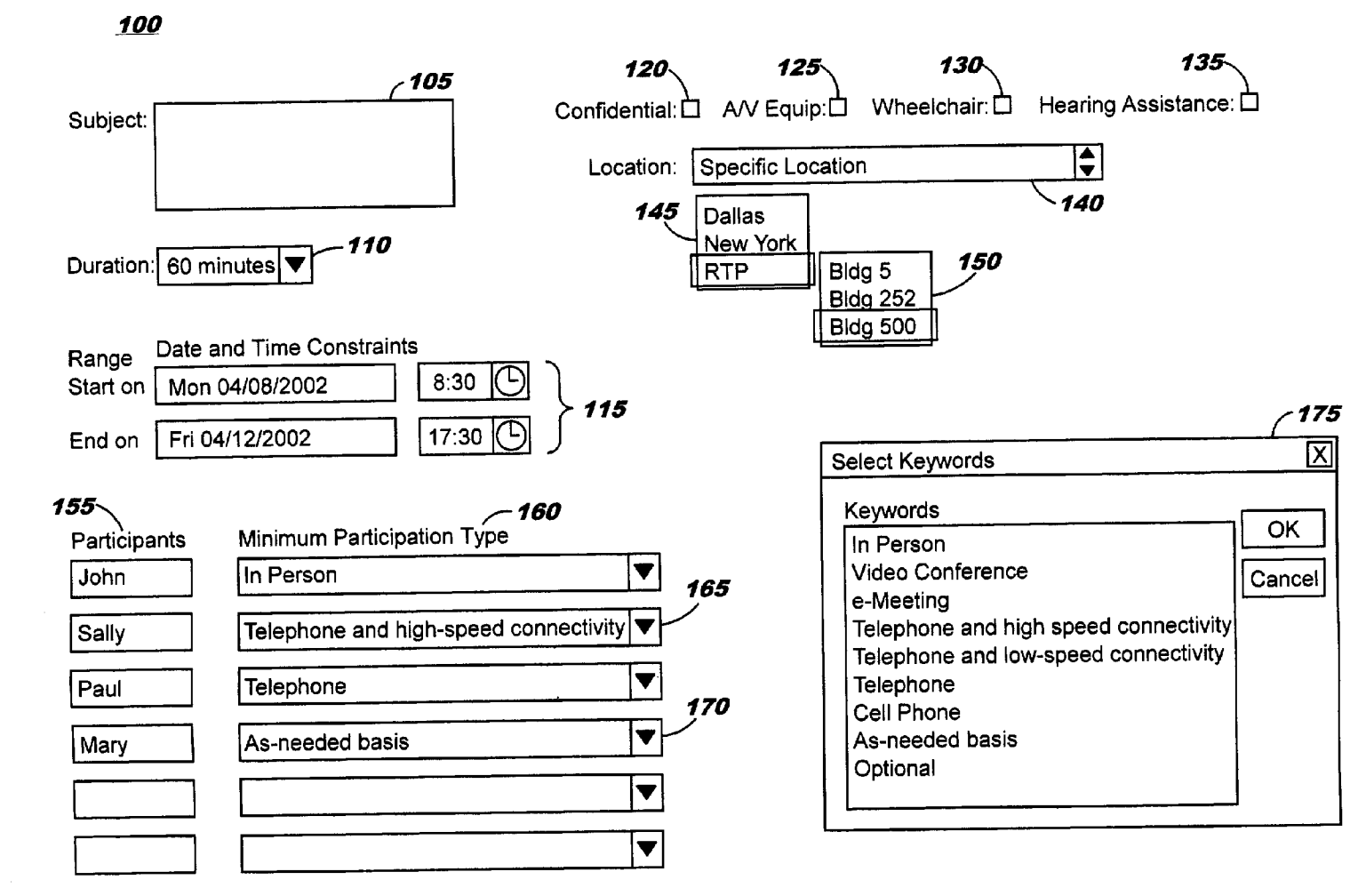

When a user of the present invention requests a search for finding available free time, preferred embodiments allow specifying a plurality of meeting scheduling criteria. FIG. 1 shows a sample GUI display 100 that may be used to enter an optional meeting subject 105 and one or more of these scheduling criteria. The meeting duration is specified (as shown at 110), along with date and time constraints (see element 115). The date and time may be specified as an exact meeting date/time, however the user preferably specifies a range of dates and/or times within which the meeting must be scheduled (thereby allowing greater flexibility in scheduling).

Check boxes are preferably provided where one or more meeting-specific criteria may be specified. As described earlier, corporate policies may place constraints on meetings having sensitive subject matter, such as whether participation by cell phone is acceptable. As another example of corporate policy constraints, travel might not be authorized for certain types of meetings. Thus, the sample display 100 allows the person setting up the meeting to indicate whether the subject matter is confidential (see element 120). Additional/different types of policy information may be significant to a particular enterprise as well. For example, an enterprise's policy might state that meetings on certain topics cannot be held unless all invitees are available, and a check box may be provided to set this constraint on or off.

Availability of audio/visual equipment is an example of facility-related constraints a user might specify when scheduling a meeting. A corresponding check box has therefore been provided in the sample display at 125. Additional examples of facility-related meeting constraints which are specified by the meeting scheduler include whether the selected facility must be wheelchair accessible (see element 130) or whether it must provide support for hearing-impaired participants (see element 135). (In cases where the user has pre-selected the meeting facility, then these facility-related constraints are typically not useful. However, if the user does not specify a particular meeting location and instead requests that the search process also locates a suitable location for the meeting, as will be described in more detail below, then these constraints are preferably compared against the candidate locations during the search process.)

Preferred embodiments of the present invention are adapted for dynamically determining user-specific information that constrains the selection of meeting facilities. Thus, even though the person scheduling the meeting may be unaware of physical limitations of the invitees (and therefore may not use the check boxes shown in FIG. 1), this information will be available for use during the search process. In preferred embodiments, user preferences are consulted for determining an individual's particular constraints on meeting facility selection. It may also happen that a corporate database contains information about physical limitations of the corporation's employees; in this case, individual constraints may also or alternatively be obtained from such a database.

When the person scheduling the meeting wishes to constrain the search process to a specific location, a location entry field 140 is preferably used. In this example, the user has selected "Specific Location" and the display shows that a two-level menu approach is provided to specify the location, where the first level offers site choices of "Dallas", "New York", and "RTP", and "RTP" has been selected. See element 145. Having selected the RTP site, a second level of choices are provided, and may optionally be used to constrain the search to locations within that site. In the example, the second-level choices represent particular buildings, denoted as "Bldg 5", "Bldg 252", and "Bldg 500", and the "Bldg 500" choice is shown as being selected. See element 150. An optional filtering operation may be applied, as described above, such that the choices presented on the menus represent choices which meet the constraints that have been provided. As stated above, selecting a specific meeting location is optional, and the search process may be used to suggest potential locations. This is selected using one of the other two options for box 140: Select Location First or Search All Possible Locations. (As will be obvious, in a multi-site implementation where sites are geographically dispersed, performance will be improved by selection of a particular site. Thus, the user might be allowed to select the RTP site in the first level menu but omit choosing a particular building in the second level. Furthermore, an implementation of the present invention may support more than two levels in the menus. For example, an additional level might be added to account for a complex or group of buildings.)

It should also be noted that when in-person participation is not required, such as when invitees will participate by telephone (e.g., in a conference call), it is not strictly necessary to identify a location. Thus, an implementation of the present invention may be adapted for suppressing entry of the location information based upon the required participation levels for this meeting (which are described below with reference to element 160). Or, if location information has already been entered, an implementation may be adapted for ignoring the specified location if the meeting will be scheduled without the invitees physically present. (Ignoring the location in such cases may be done to improve performance of the actual search process.)

The meeting invitees/participants are identified, as shown at 155. A name or other identifier is entered that allows the searching process to find the calendar data for that invitee. While the sample display shows individual people's names, a facility might be supported for identifying groups of people (such as by entering a department name or number). Optionally, the calendar data to be used in the search may be data from group calendars, in addition to or instead of data from individual calendars.

Figure 12:
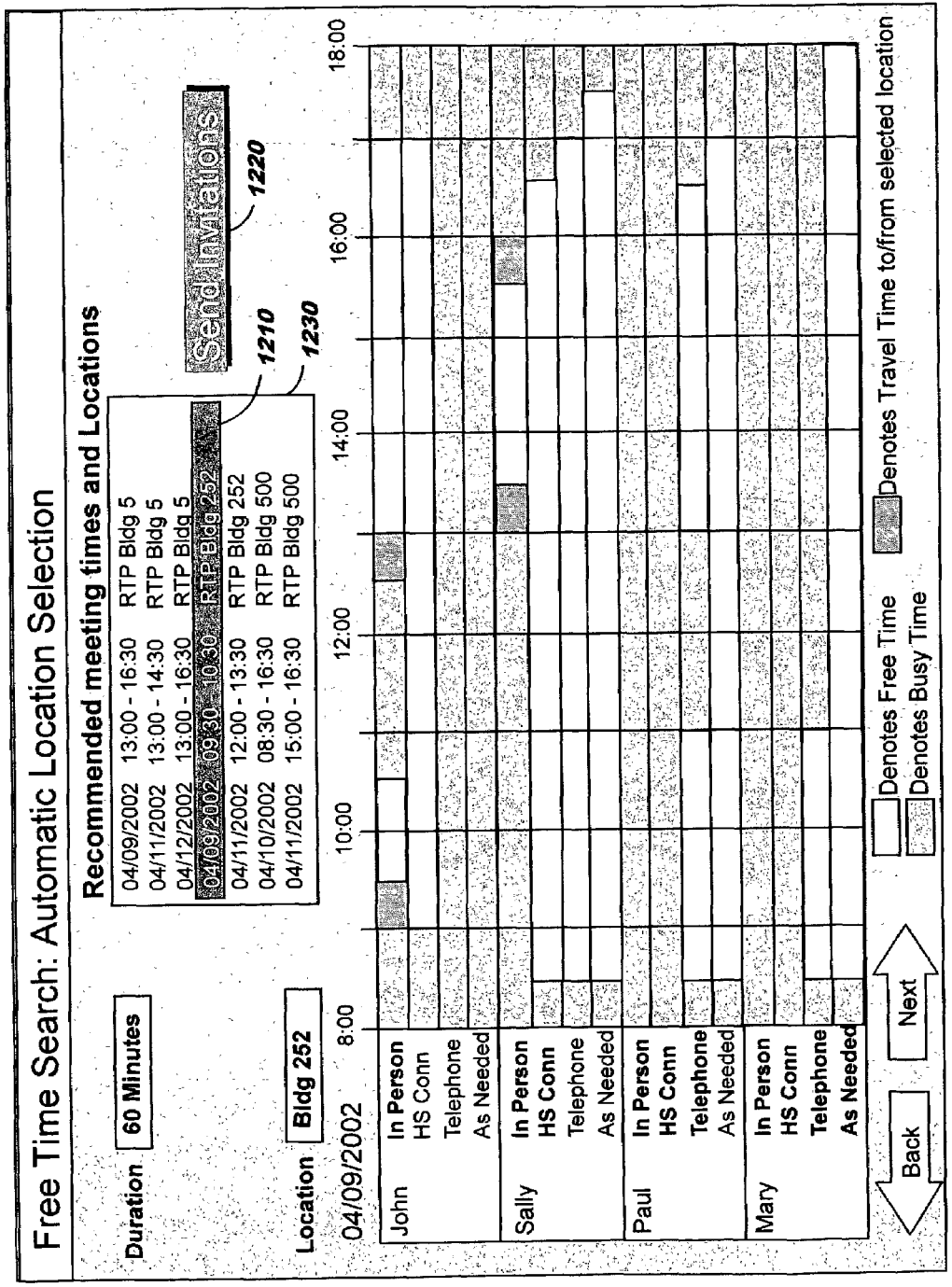
FIG. 12 illustrates a sample GUI showing results of a search where multiple potential meeting times and locations were found.

Optionally, an implementation of the present invention may allow the meeting scheduler to identify a list of people whose participation in the meeting is optional. Preferably, the calendar data for these optional participants is not used when searching for acceptable meeting times and locations. However, that calendar data is preferably used when displaying results of the search (to allow the meeting scheduler to determine how these optional participants will be affected by selecting a certain time or location for the meeting, for example). FIG. 12, described below, is an example of how search results may be displayed.

The minimum participation level for the meeting invitees is also specified by the person scheduling the meeting. The sample display 100 illustrates a capability for specifying different participation level requirements for each person included in the search. See element 160. (Alternatively, an implementation of the present invention might support a single minimum participation level for all meeting invitees. This has not been illustrated.) According to preferred embodiments, participation levels are defined as a sequentially-ordered list or ranking. "In person" participation, which imposes a requirement for the invitee's physical presence at the meeting, is defined as the strictest or highest-ranking requirement. Selecting a minimum required participation level then implies that any higher-ranking type of participation is also allowable. A suggested participation level ranking which is used in illustrating operation of preferred embodiments is as follows, beginning with the strictest requirement:

in person participation participation by video conference participation by e-meeting participation by fixed telephone, high-speed Internet connection available participation by fixed telephone, low-speed Internet connection available participation by fixed telephone participation by cell phone "as needed" participation (i.e., the person would not necessarily attend, but would be available on an as-needed basis)

optional participation.

The "as needed" participation level may be useful for people whose participation in the meeting is not necessarily required, but who might need to be called in for brief consultation or perhaps be available for some other type of "exception basis" participation. This participation level is preferably used for communication methods where the user can be contacted from the meeting (e.g., by pager, instant messaging, telephone or cell phone call, etc.) and can respond to the contact request. The response might be by return page, instant messaging chat, return phone call, or perhaps even by physically attending the meeting. The response is not required to use the same communication means as the contact request. (Use of a one-way pager for receiving the contact notification may be acceptable in cases where other means will suffice for responding.)

So, for example, if the minimum required participation level for Mary is specified as "As Needed", as shown at 170, this signifies (according to preferred embodiments) that this participation level and any other participation level higher in the ranking are acceptable to the person who schedules the meeting. Sally must be able to attend the meeting either in person, by video conference if not in person, or by e-meeting if not in person or by video conference, or at least with a telephone and high-speed connectivity available. See element 165. Note that as the strictness of the participation level requirement decreases, the likelihood of the invitees being able to participate in the meeting can be expected to increase.

The list of choices shown at element 175 represents the suggested participation level ranking discussed earlier. Note that this list of choices is merely illustrative. Additional, fewer, or different choices may be offered alternatively.

It should also be noted that this in-order participation level ranking is merely one manner in which various types of required/desired user participation may be specified. Alternatively, it might be preferable in a particular implementation of the present invention to require each invitee's participation level to be matched exactly as specified (such that if participation by telephone is specified by the meeting scheduler, for example, then an invitee is considered unavailable if he cannot participate by telephone). Other techniques may be suggested to one of skill in the art, once the teachings of the present invention are known, and these alternative approaches may be used without deviating from the scope of the present invention.

Turning now to a discussion of performing the context-sensitive free-time search, preferred embodiments provide several options for identifying the meeting location. First, the user who is scheduling the meeting may specify a particular meeting location. Or, the user may provide parameters with which a "good" or "preferred" location is programmatically selected/recommended by an implementation of the present invention. As another option, the location may be left unspecified to maximize the search flexibility. (It should be noted, however, that performance may degrade when the location is left unspecified in environments having many meeting invitees, many locations, and/or many possible participation levels, due to the larger number of potential matches that will be evaluated during the search.) Refer to the discussion of Block 930 of FIG. 9, below, for more information on factors that may be used to select a "good" location.

Figure 9:
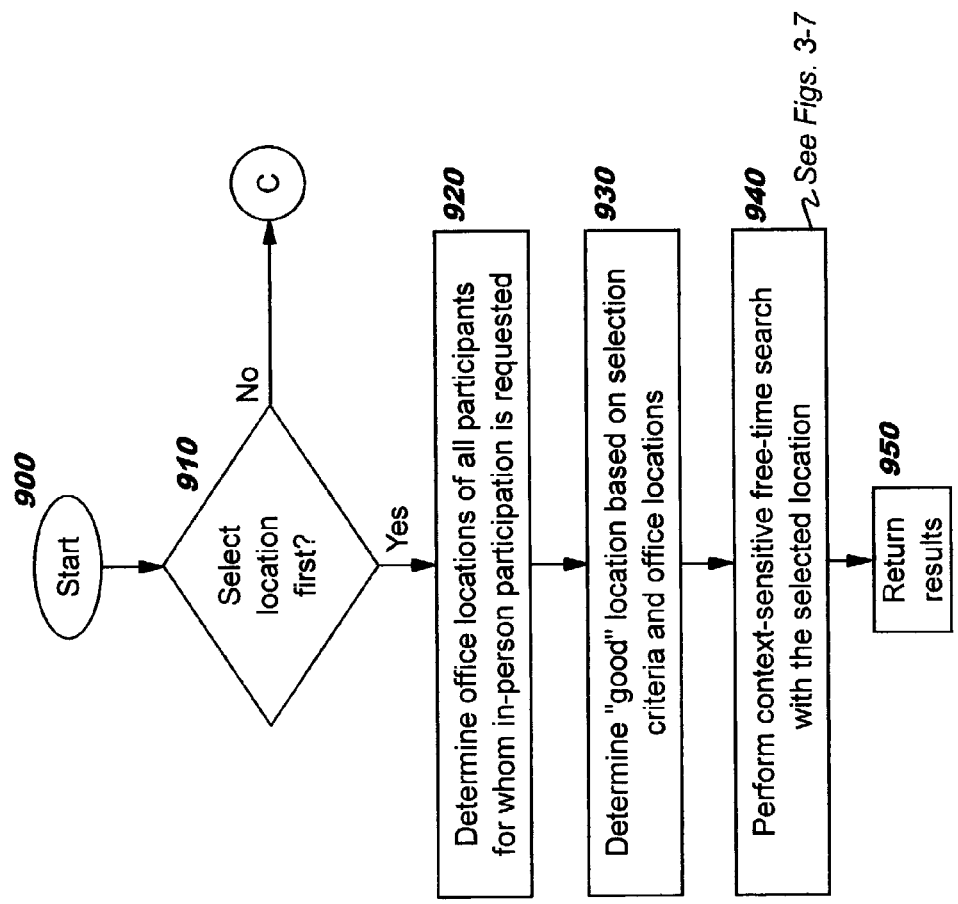
FIGS. 9-11 provide flow charts which set forth logic that may be used to direct free-time searches in the absence of a pre-specified meeting location, according to preferred embodiments of the present invention.
Figure 10:
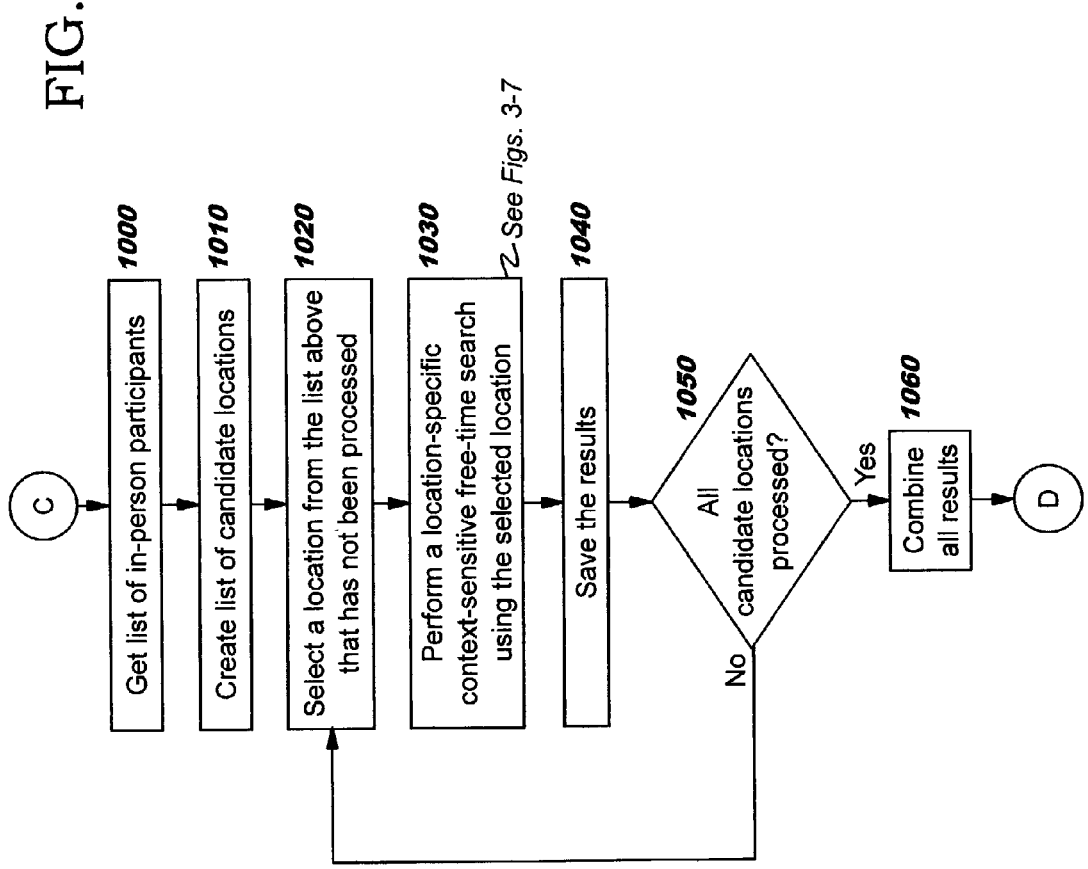
Figure 11:
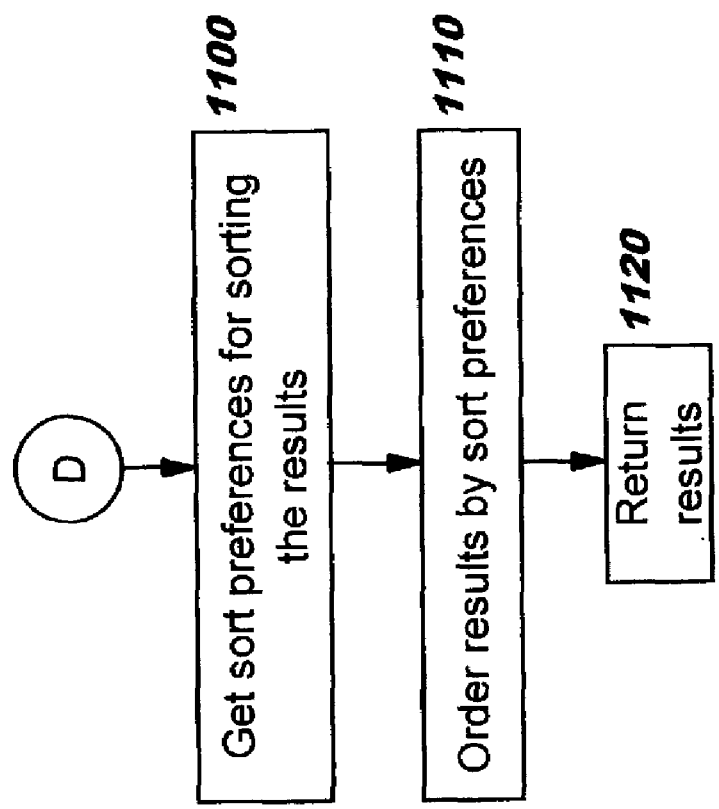

The flowchart in FIG. 2 provides a high-level overview of how preferred embodiments of the present invention operate. The process starts at Block 200, and proceeds to Block 210 where the user's search criteria (entered using a technique such as that described with reference to FIG. 1) are obtained. As stated earlier, these requirements may comprise the list of invitees (referred to equivalently herein as participants), one or more participation levels, the meeting duration, a target meeting time frame, optionally a location, and various other types of information such as those which have been described earlier. At Block 220, a test is made to see if the user performing the search has specified where he wants the meeting to be held (using, in the example depicted herein, selection boxes 140, 145, and 150 of FIG. 1). If not, processing continues at Block 230, which represents performing the search when a location is not specified. FIGS. 9-11 provide details on how this operates in preferred embodiments. (Note that preferred embodiments of this processing invoke the location-driven search of FIGS. 3-7. See Blocks 940 of FIGS. 9 and 1030 of FIG. 10.)

When the user specified a search location, the test in Block 220 has a positive result, and control transfers to Block 240 where a context-sensitive search having a specific target location is performed. FIGS. 3-7 provide details on how this search proceeds in preferred embodiments.

Following completion of Blocks 230 or 240, processing reaches Block 250 where the computed search results are presented to the user for his review. A sample search results display is provided in FIG. 12, and will be described below. After the user's review, he may decide to re-do the search (i.e., perform it again, perhaps with different invitees and/or different constraints), to quit, or to accept a generated result and send out meeting invitations to the invitee list.

If the user selects to re-do the search, then control returns to Block 220 to start again. If he selects to exit, then the processing of FIG. 2 ends. If he selects to accept a result of this search, control reaches Block 270. It may happen in some cases that the generated results contain a number of possible dates, times, and/or locations for the meeting. In these cases, before sending the invitations, the user needs to select from among the choices, as indicated in Block 270. After making a selection, the invitations are sent (Block 280), and this iteration of the search process then exits.

Prior art calendaring systems perform automated invitation-list mailings, whereby meeting invitations are sent electronically to a participant list. However, the intelligent free-time search of the present invention provides advantages over these prior art systems (which do not account for travel time and which are not adapted for handling a variety of participation levels or other types of constraints). Preferably, the invitations generated at Block 280 include a user-specific designation of the minimum type of participation expected. And, since the search process as disclosed herein knows the travel time between locations for each in-person participant, user-specific travel time information is preferably included in the generated invitations. In preferred embodiments, the travel time is handled by sending up to three invitations: one for the meeting, and if required, one for the travel time before the meeting and/or one for the travel time after the meeting. In alternative embodiments, a single meeting invitation is sent in Block 280, and includes the user-specific travel times which were determined. The recipient may then manage those travel times manually.

Referring now to FIGS. 3-7, flow charts will be described which may be used to implement free-time searches for scheduling a meeting in a particular location. Conceptually, the context-sensitive free-time search may be viewed as follows:

- A person's availability for a day can be represented by a set of "busy bars" on a time-line representing the day, where time segments are blocked out on the time-line to represent the events which are scheduled on the calendar owner's schedule. These blocked out time segments are busy (i.e, unavailable) time, and the other time segments are free time. Busy bars will be described in more detail with reference to the illustrations in FIGS. 8 and 12, below.
- A person may have multiple busy bars, each representing a type of participation being evaluated by the search process. For example, suppose that cell phone participation is being evaluated. If Betty is available continuously between 9 a.m. and 6 p.m. by cell phone, then she will have a cell phone busy bar with the time segments from (1) midnight to 9 a.m. and (2) 6 p.m. to midnight both marked as "busy", while the time segment between 9 a.m. and 6 p.m. is marked as "free". Similarly, if Betty is available for in-person meetings only between 10 a.m. and noon, then her in-person busy bar will have the day broken up into the three segments demarcated by 10 a.m. and noon.
- The context-sensitive free-time search then proceeds by evaluating the busy bars for each invitee which correspond to that invitee's allowable participation levels, based on the participation levels specified by the person conducting the search.
- The free/busy times on the busy bars are then adjusted as necessary to take into account the extra considerations (i.e., travel time when evaluating in-person participation, corporate policy, and/or user preferences) which are supported by an implementation of the present invention.
- The free-time search then proceeds to analyze the busy bars, looking for free-time segments sufficiently long to schedule the meeting to allow participation by all invitees.

The location-specific searching process illustrated by FIGS. 3-7 begins at Block 300, and passes control to Block 310 where one of the invitees which has not yet been processed is selected. (Each of the invitees will be processed in turn, one at a time, by looping back to Block 310 from Block 720 of FIG. 7.) Block 320 obtains information from the calendaring system that shows this person's status for various types of availability. Preferably, all calendar data (including working hours, etc.) for this user is retrieved. User preferences are then consulted to determine this user's individual status during each event. (For example, a particular user might define a preference that indicates "during event type X, I am available by cell phone"; another preference that indicates "during event type Z, I am not available"; and so forth.) The availability information therefore represents availability in person, via telephone, via cell phone or pager, the user's instant messaging status, and so forth. Refer to the aforementioned related inventions for a detailed description of how this information may be stored in, and retrieved from, the advanced calendaring system disclosed therein. (Generally, the techniques disclosed in the related inventions enable a user access to programmatically derived data that is analogous to that which could be derived manually by a person looking at a calendar to determine if someone is available at a certain time and then manually interpreting the calendar in view of other information of the type that would be given to an administrative assistant. For example, before leaving for a business trip to Europe, Betty might tell her secretary "I won't be taking my cell phone, so even though I am normally reachable by cell phone while I'm traveling, that does not apply for this particular trip." By augmenting calendar data as disclosed in the related inventions, and leveraging a system of preferences, the advanced calendaring system disclosed therein knows the various means by which a particular user is available.)

After completing Block 320, the search process knows, for each time segment, whether there is a free event or a busy event on this invitee's calendar. Furthermore, when the events include location information, as discussed earlier, the search process knows where this meeting invitee is scheduled to be during each time segment. For those types of participation which have no other constraints (such as "available by telephone" participation), no further analysis is done at this point. For those participation types which include technology requirements, such as "telephone plus low-speed connection" participation, the user preferences database and/or location database (either of which may contain information such as the speed of connectivity from a particular location) are consulted (Block 330) to determine whether that technology requirement is met for this invitee during the time segment of interest. In this manner, each invitee's availability can be determined, for any of the types of communication mechanisms. So, for instance, if this user is available by telephone and will have access to a low-speed connection, then a busy bar for this person will contain free and busy blocks to represent when the user is available for participation in this manner.

This user's availability can then be displayed graphically by a time-line with a set of busy bars, where those bars represent the user's free/busy times. (Prior art calendaring systems that perform free-time searches typically represent search results using a busy bar with free/busy-time segments. However, they do not provide busy bars per participation level.) Block 340 takes the data from Blocks 320 and 330 and creates a set of these busy bars for this meeting invitee, where each busy bar in the set represents one of the ways in which participation is allowed for this meeting. Along with this free/busy information, preferred embodiments maintain some of the pertinent underlying calendar information (in particular, the location value and event type associated with the calendared events) as it will be needed later as these free/busy-time segments are altered (see Blocks 440 and 460 of FIG. 4).

Figure 4:
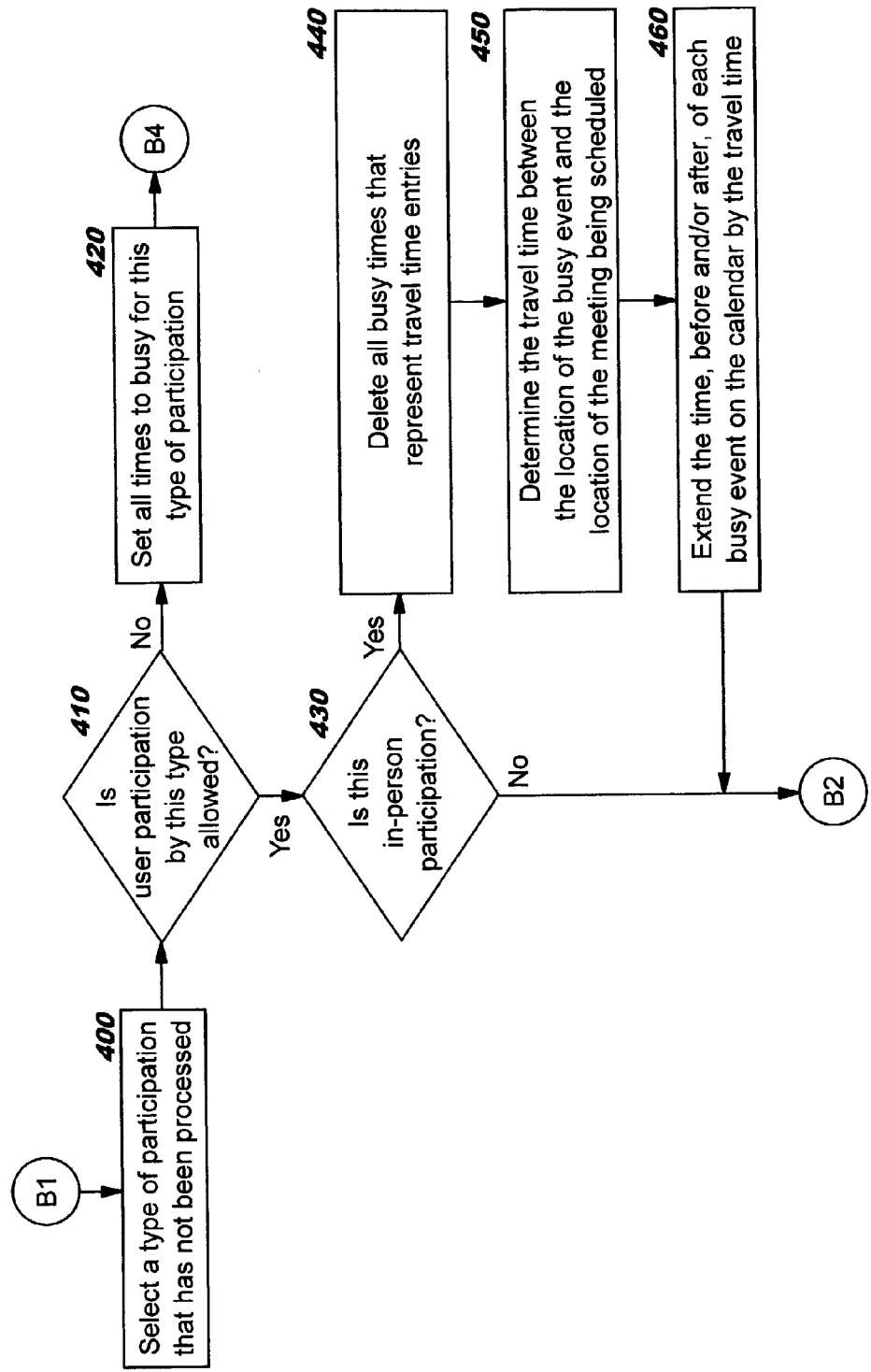

Upon completion of Block 340, processing continues at Block 400 of FIG. 4, where each of the participation types (and corresponding busy bars) will be evaluated. (Control returns to Block 400 from Block 700 of FIG. 7, while iterating through the participation types for this meeting invitee). Block 400 selects one of the remaining participation types which has not been analyzed for this invitee.

The test in Block 410 checks to see if this busy bar represents an allowable participation type for this person at this particular meeting. For example, this busy bar might correspond to "as needed" availability, when this invitee is required to be present by telephone. Thus, according to the participation level ranking, participation in the "as needed" mode is not allowed for this invitee, and the test in Block 410 will have a negative result. In cases such as this, this busy bar will be marked as completely busy (Block 420), since it cannot be used.

Note that the "all-busy" processing of Blocks 410 and 420 is an optimization used in preferred embodiments to improve the search process by not searching time segments for disallowed participation types. (Alternatively, this optimization may be omitted without deviating from the concepts disclosed herein.) This all-busy status applies only for purposes of searching the busy bars; the calendar entries are not actually changed. Alternatively, the busy bars for disallowed participation types can be processed but then ignored during the search. If it is desirable to show the invitee's availability to the meeting scheduler when the results of the search are presented (as shown in the sample results in FIG. 12), then this invitee's availability status for this participation type may be processed (e.g., using the process depicted in FIGS. 5 and 6 to account for corporate policy and user preferences) and displayed to the meeting scheduler. It will be obvious to one of ordinary skill in the art how the flowcharts can be adapted for this purpose. (For example, the processing of Blocks 410 and 420 may be deleted, such that actual availability for the disallowed participation types is computed by performing the logic of FIGS. 5 and 6, and then omitting the busy bars for the disallowed participation types when performing the search.)

Figure 7:
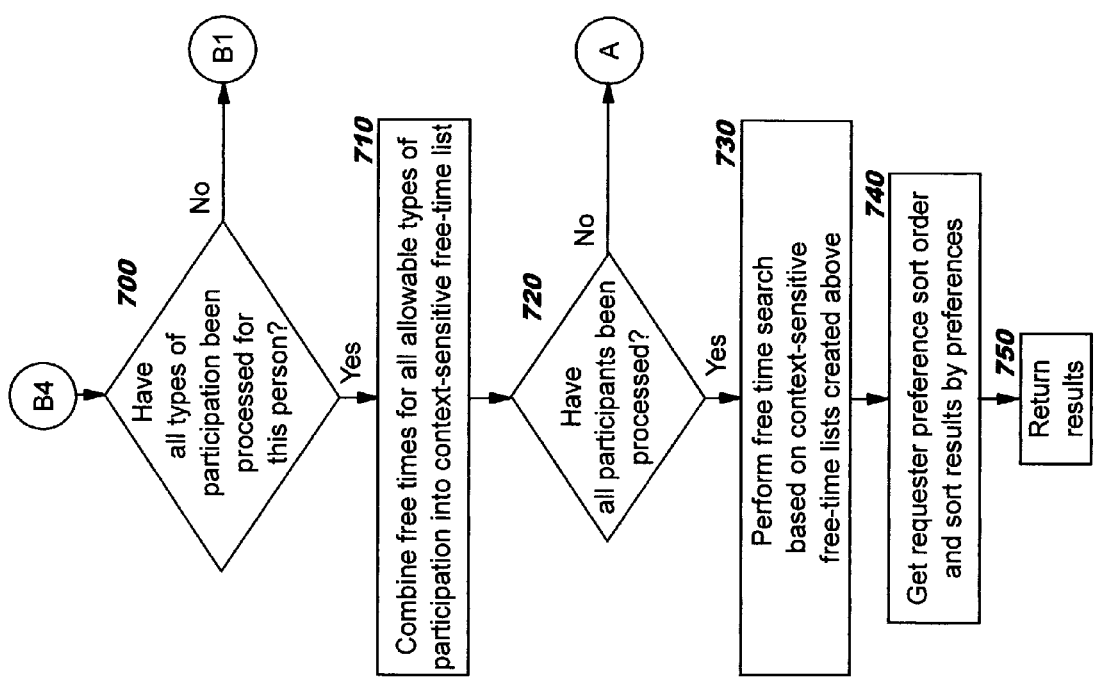

After performing the optimization in Block 420, control then transfers to Block 700 of FIG. 7, which will continue the iteration through this invitee's busy bars until reaching the end.

On the other hand, suppose that this busy bar represents "telephone plus low-speed connectivity", when the invitee's required participation level is "telephone" availability. In this case, the busy bar for telephone and low-speed connectivity represents an allowed participation type. Thus, control will transfer to Block 430. A test is made at Block 430 to see if the current participation type being evaluated is in-person participation. If so, then preferred embodiments of the present invention programmatically factor this invitee's user-specific travel time and constraints into his/her availability by performing the logic of Blocks 440-460. (If the participation type being evaluated is not in-person participation, then travel time is not pertinent and in preferred embodiments is not computed; instead, processing continues at Block 500 of FIG. 5 to begin evaluation of additional scheduling constraints.)

Thus, when the in-person busy bar is being processed, control reaches Block 440 which begins the process of adjusting time segments on the in-person busy bar to reflect travel time to and from the meeting being scheduled. Block 440 deletes, from this busy bar, all the blocked (i.e., "busy") time segments that represent travel time. This is because travel time may increase or decrease, depending on when/where the meeting under evaluation is scheduled.

Block 450 then determines, for each busy-time segment on the busy bar, how long it would take the invitee to travel from the location of that event (i.e., the event which causes a time segment on the bar to be marked as busy) to the location of the meeting under evaluation. Similarly, travel time is preferably computed for leaving the meeting under evaluation and traveling to the invitee's next scheduled event. If the travel time between locations cannot be determined during operation of Block 450, then preferred embodiments preferably use an administrator-assigned default travel time. (Or, alternatively, an implementation may be written to prompt the user who is scheduling the meeting to provide an estimate of the travel time between these locations.) In preferred embodiments, user preferences are applied to the travel time estimates to yield this meeting invitee's individual travel time. (As an example of a user-specific travel time preference, Barney might specify that 10 minutes should be added to all travel times where driving is involved, because he likes to park at the far end of the parking lot.)

Block 460 then extends the time of each busy-time segment on the busy bar, in both directions (as applicable, depending on whether travel is required for the neighboring time segments), by the length of the travel times computed in Block 450. (Note that different travel times might be computed for traveling to the meeting and for traveling from the meeting.) Now, as a result of the processing of Blocks 440-460, any free time remaining on the busy bar is available for scheduling the new meeting, and the person will have time to get to and from that meeting.

Figure 8:
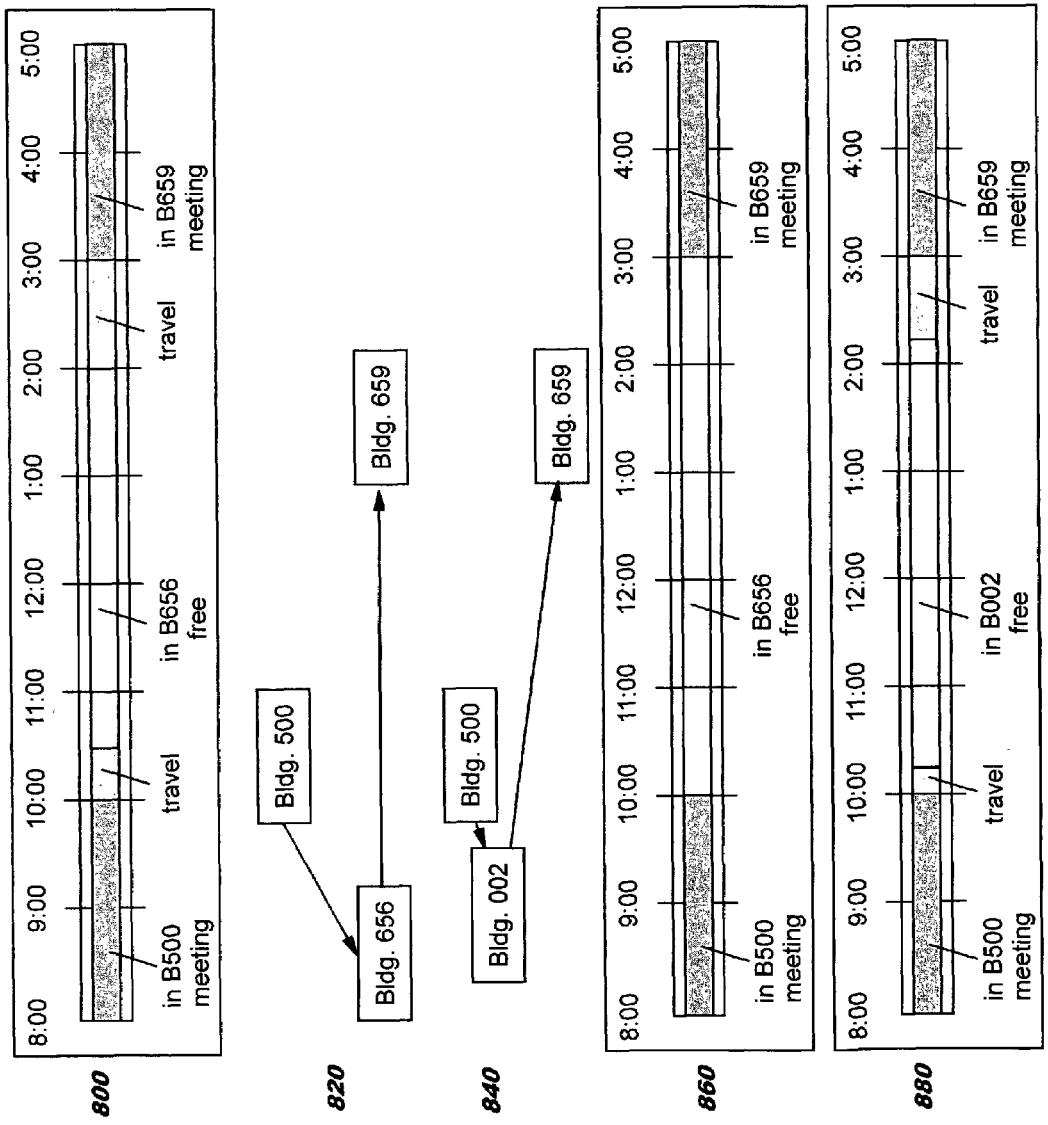
FIG. 8 illustrates how a sample "busy bar" is programmatically adapted by preferred embodiments of the present invention to account for travel time.

An example of operation of Blocks 440-460 will now be illustrated by reference to FIG. 8, showing how a busy bar is programmatically adapted in preferred embodiments to account for travel time. The original busy bar 800 shows that the user is in Bldg. 500 from 8 a.m. to 10 a.m., then travels for 30 minutes and arrives at Bldg. 656 at 10:30. Suppose this user's office is located in Bldg. 656, and that she had been in Bldg. 500 for a meeting. Now, the user remains in Bldg. 656 until 2 p.m., and is then scheduled to travel for one hour to Bldg. 659 for another meeting or other event. She is therefore scheduled to arrive at Bldg. 659 at 3 p.m., and to leave at 5 p.m. The chart at 820 shows an example of the user's travel path from Bldg. 500, then to Bldg. 656, and then to Bldg. 659. (Chart 820 is provided merely for purposes of illustration; this chart is not a requirement of the present invention.) Now suppose that this user's calendar is being evaluated to see if she can participate, in person, at a meeting in Bldg. 002. Because her normal work hours are from 8 a.m. to 5 p.m., it appears by evaluating the busy bar 800 (which has been constructed according to the prior art, and has already blocked out travel time for the two meetings) that the only possible time for scheduling the meeting with this user's participation will be between 10:30 a.m. and 2 p.m. However, the scheduling process of the present invention understands that some of the blocked-out time between 10 a.m. and 10:30 a.m., and between 2 p.m. and 3 p.m., may actually be available for a new meeting.

The chart at 840 illustrates how the user's travel path may change if she is scheduled to attend a meeting in Bldg. 002, where she will travel from Bldg. 500, then to Bldg. 002, and then to Bldg. 659. (If the meeting in Bldg. 002 plus its travel time requirements do not fill the entire mid-day space, then the user might actually return to Bldg. 656 before and/or after Bldg. 002, but that is not pertinent to the present illustration.) Chart 840 shows that the user may actually require less time for traveling if this extra meeting is scheduled, due to its location.

Thus, the travel time entries on busy bar 800 will be deleted by operation of Block 440, creating the busy bar shown at 860. Now suppose that instead of 30 minutes and one hour for travel, as on the original busy bar 800, information available to the scheduling system in Block 450 indicates that travel time from Bldg. 500 to Bldg. 002 is 15 minutes, and travel time from Bldg. 002 to Bldg. 659 is 45 minutes. These new travel times are placed on the in-person busy bar 860 by Block 460, creating the adjusted busy bar 880. Therefore, this user can participate in (and arrive on time for) the meeting in Bldg. 002 if it is scheduled to start no sooner than 10:15 a.m., as shown in the revised busy bar at 880. Similarly, she can arrive on time for her 3 p.m. meeting in Bldg. 659 so long as her meeting in Bldg. 002 gets over at least by 2:15 p.m., allowing her 45 minutes to travel to Bldg. 659. There is therefore a 4-hour window in which this user is available for participating in-person at a mid-day meeting in Bldg. 002 (and not a 3½-hour window, as would have been indicated by the prior art busy bar 800).

Figure 5:
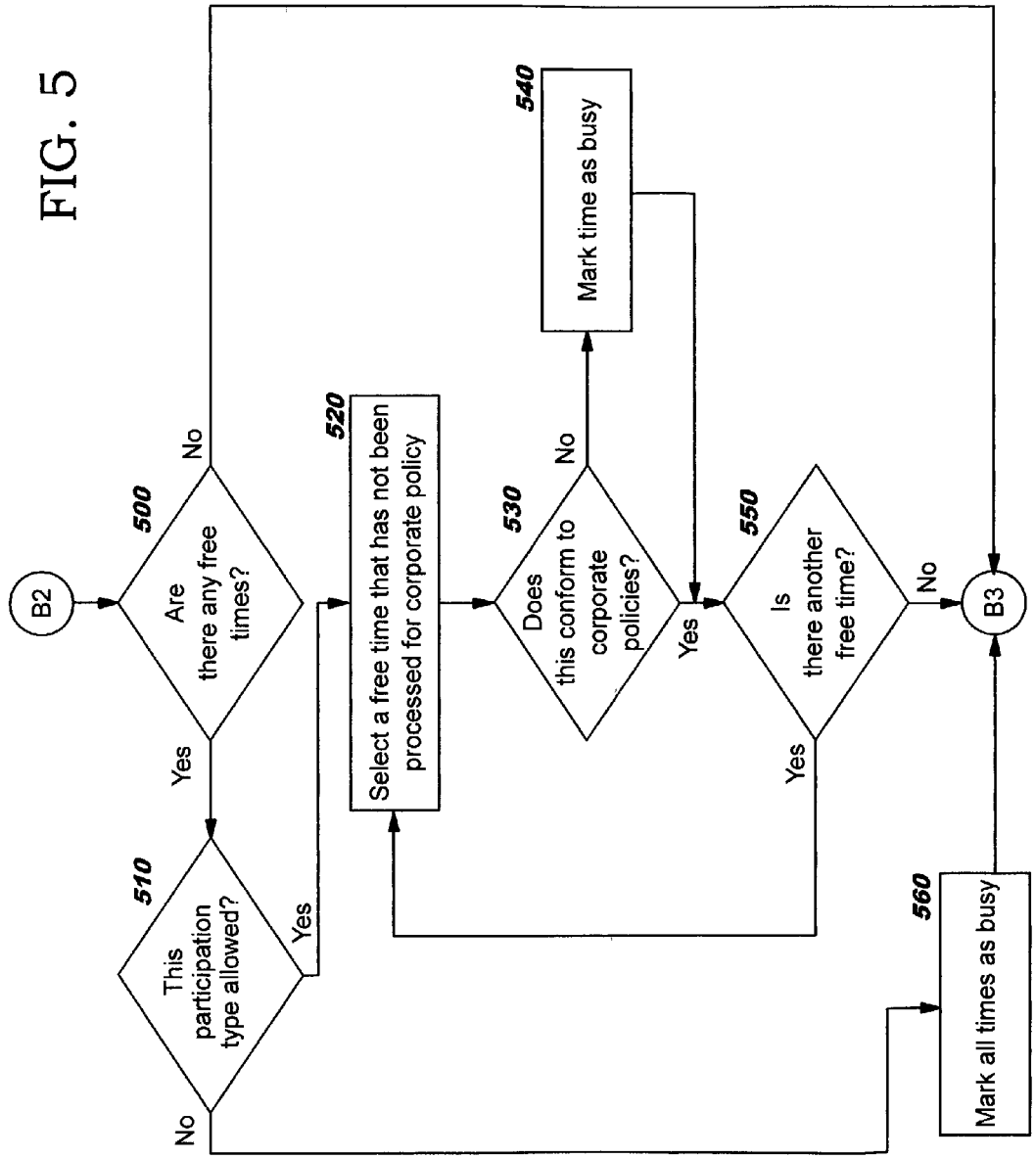

Returning now to the discussion of the flowcharts, having thus adjusted the in-person busy bar in Block 460, processing continues at Block 500 of FIG. 5.

The logic in FIG. 5 applies corporate policy considerations to the free-time search to see if, according to corporate policy, the user's free-time segments really are available for this meeting. For example, if the busy bar represents cell phone availability and the meeting is confidential, and if the corporate policy is that cell phones are not to be used for confidential meetings, the processing of FIG. 5 would result in the busy bar for cell phone availability being marked as totally busy (i.e., never available for this meeting).

The test in Block 500 checks to see if there are any free-time segments in this busy bar. If not, then control transfers to Block 600 of FIG. 6 to begin applying user-specific preferences and considerations. Otherwise, processing continues at Block 510, which checks to see if this type of participation is allowable, according to policy considerations. (As stated above, if the participation type is via cell phone and the meeting scheduler has indicated that confidential topics will be discussed, then the corporate policy might prohibit use of this type of participation.) If not, then control transfers to Block 560, which sets all time segments on this busy bar to "busy" (i.e., unavailable for scheduling); control then transfers to Block 600 of FIG. 6. Note that Blocks 510 and 560 are an optional optimization that may mark the entire busy bar as "all-busy", based on corporate policy, as an alternative to repeatedly looping through each time segment. This optimization may be omitted without deviating from the concepts disclosed herein.

When this participation type is allowable according to policy considerations, control transfers from Block 510 to Block 520 where a free-time segment that has not yet been processed by the logic of FIG. 5 is selected. Block 530 checks to see if this time segment conforms to corporate policies, and if not, then Block 540 marks the segment as busy. For example, using the previously-described example, suppose the time segments on the busy bar for cell phone participation are being processed, and the time segment being evaluated represents the person traveling by car. If the corporate policy is that employees do not use cell phones while driving, then this time segment is considered unavailable for cell phone participation. (Preferably, whether an employee is driving is derived from the calendar data. For example, a check box may have been provided for the employee to indicate this information on her calendar.)

Block 550 checks to see if there are any more free-time segments that can be evaluated. If so, control returns to Block 520 to process the next time segment; otherwise, processing continues at Block 600 of FIG. 6.

Figure 6:
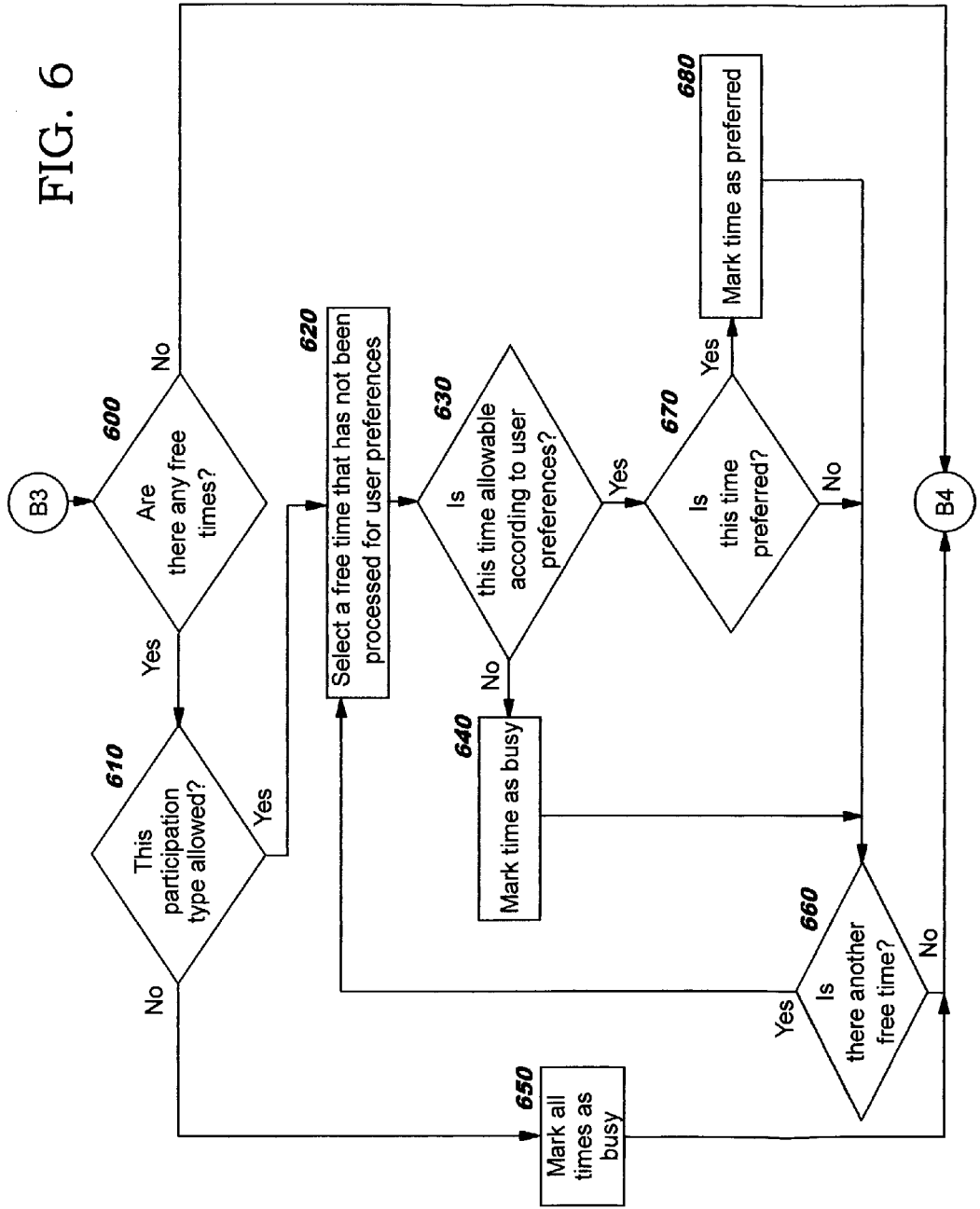

In FIG. 6, all free-time segments on this busy bar are processed to see if, according to user preferences, the user really is available for this meeting. For example, while working at home, the user might not be available for any travel, and thus should be considered unavailable for any in-person meetings. The processing of FIG. 6 operates in a similar manner to the processing of FIG. 5, which handled corporate policy considerations. User preferences may also result in some free times being marked as "preferred" times for the meeting (e.g., for the user who prefers that meetings be scheduled at particular times of the day), with the result that when more than one possible meeting time is found, the preferred times may be chosen over other times or presented at the top of a list of results for the person scheduling the meeting to choose from.

Block 600 begins the application of user preferences by checking to see if there are any free times in this busy bar. If not, then control transfers to Block 700 of FIG. 7. Otherwise, processing continues at Block 610, which checks to see if this type of participation is allowable, according to this user's preferences. If not, then control transfers to Block 650, which sets all time segments on this busy bar to busy; control then transfers to Block 700 of FIG. 7. (Blocks 610 and 650 are an optional optimization that may mark the busy bar as "all-busy", based on user preferences, as an alternative to repeatedly looping through each time segment. This optimization may be omitted without deviating from the concepts disclosed herein.)

When this participation type is allowed, processing continues at Block 620 where a free-time segment that has not yet been processed by the logic of FIG. 6 is selected. Block 630 checks to see if this time segment is allowable for scheduling the meeting, according to this invitee's user preferences. If not, then Block 640 marks the time segment as busy and control transfers to Block 660. Recall that user-specific technological issues may be addressed under the general category of user preferences. Thus, as an example, if this invitee's user preferences indicate that she has access only to a low-speed connection during this time segment but the meeting requirements call for her to participate with a high-speed connection, then this time segment is not allowable and Block 640 will mark it as busy.

If, on the other hand, the user preferences do not prevent the invitee's participation during this time segment, then processing continues at Block 670, which checks to see if the user preferences indicate this time segment as being "preferred". For example, this might be an early morning time segment but this invitee's preferences are for late afternoon meetings. Depending on the outcome of the test at Block 670, Block 680 marks the time segment (e.g., using an associated bit setting or other indicator) as being preferred.

After the time segment has been processed, control reaches Block 660, which checks to see if there are any more free-time segments that have not been processed. If so, then control returns to Block 620 to begin processing the next segment; otherwise, processing continues at Block 700 of FIG. 7.

The processing of FIG. 7 begins by checking (Block 700) to see if all participation types for this person have been processed (i.e., whether evaluation of all the busy bars is complete). If not, then control returns to Block 400 of FIG. 4 to begin processing the next participation type. Otherwise, processing continues at Block 710.

In Block 710, the free-time segments for all of the allowable participation types are combined into a context-sensitive free-time list, which represents this invitee's context-sensitive free time by any of his allowed participation means.

Block 720 then checks to see if the calendars for all of the meeting invitees have been analyzed. If not, control returns to Block 310 of FIG. 3 to begin processing another invitee's schedule. Otherwise, Block 730 searches through the free-time lists to find available time. In preferred embodiments, this search is performed using prior art techniques, now that the free-time lists have been adapted using techniques of the present invention to more accurately represent each person's free time (in the context of that person's required participation level, user preferences, and so forth, as has been described).

The search process performed at Block 730 may also search for a meeting facility (e.g., a conference room). Techniques for searching through available meeting facilities are known in the art, and may be used by an implementation of the present invention. Note that the person scheduling the meeting may have requested one or more facility-specific features (e.g., see the audio visual equipment check box 125 on display panel 100 of FIG. 1), and these requested features should be accommodated in the selection of meeting facility.

In preferred embodiments, an optional sorting operation is performed in Block 740, which obtains sort preferences applicable to the person scheduling the meeting. These preferences may be obtained interactively (e.g., by prompting the meeting scheduler), or by retrieving previously-stored information from a repository, etc. Examples of preferences include how many choices for potential meeting times/locations should be presented at one time, whether the invitee names should be presented in a particular order, whether the available meeting rooms should be ordered in terms of desirability (e.g., based on how well they match the list of requested features). Related U.S. Pat. No. 7,096,232 (Ser. No. 09/875,556) describes use of filter and sort preferences for a user submitting a query; refer to this related patent for additional examples.

A particular meeting scheduler may have his/her own preferences for scheduling the meeting as well, such as choosing a location close to his/her office or other physical location, or selecting a time near to some other event, and may wish to see the possible meeting times sorted according to criteria of this type. Or, the meeting scheduler may choose to see possible meeting times sorted according to when the meeting time and/or location are most convenient for the maximum number of invitees, or perhaps for one or more selected invitees. (For example, the user might select to have the meeting times/locations sorted to reflect the least amount of travel required for the scheduler's manager, or a group of high-level executives who will be attending, and so forth.) Optionally, the "preferred" status that was determined in Block 680 may be used as a sorting criterion. For example, the meeting scheduler might request for the results to be sorted according to his own preferred meeting times, or according to the meeting times preferred by his manager, or according to when the greatest number of invitee's preferred meeting times can be accommodated, and so forth.

The results obtained in Block 730 are then sorted according to the criteria requested by the scheduler, and returned (Block 750) for display to the meeting scheduler. Processing will then continue at the point from which this processing has been invoked (Block 240 of FIG. 2, Block 940 of FIG. 9, or Block 1030 of FIG. 10, in preferred embodiments), and the sorted results will be displayed.

Turning now to the flowcharts in FIGS. 9-11, logic is illustrated that drives the free-time search process when a target location has not been pre-specified (e.g., "Specific Location" was not selected in selection box 140 of FIG. 1) by the person scheduling the meeting. This processing begins at Block 900 of FIG. 9, which is invoked from Block 230 of FIG. 2, and passes to Block 910 which asks whether the person scheduling the meeting wants a meeting location to be selected/suggested before beginning the search process. As stated earlier, in environments where there are a large number of potential meeting locations and/or a large number of invitees, an exhaustive search may be time consuming, and therefore performance may be improved by narrowing the possibilities before the search begins. If the test at Block 910 has a negative result, control transfers to Block 1000 of FIG. 10; otherwise, processing continues at Block 920 to begin evaluating choices for the meeting location that will be selected (or for multiple candidate locations that will be suggested to the meeting scheduler).

At Block 920, the office location is determined for all meeting invitees whose in-person participation is required at this meeting. Block 930 then determines a preferred meeting location based on where the offices are and one or more other selection criteria. Examples of criteria that may be used for selecting a preferred location include the following: minimize the number of users who will have to travel (e.g., try to schedule the meeting in the location where the majority of the in-person attendees will be located); find a central location where travel distance, on average, will be minimized; minimize the travel distance for one or more selected participants; and so forth. Any special meeting facilities that have been requested are preferably also considered, such as those represented by the wheelchair accessibility check box 130 in FIG. 1. Selecting a facility preferably comprises accessing a list of meeting facilities that (1) are available during the time frame in which the meeting is to be scheduled, (2) meet the selection criteria requirements, and (3) have sufficient capacity for the number of potential in-person invitees. If multiple locations satisfy these requirements, then the choices are preferably displayed to the person who is scheduling the meeting, so that a single location can be selected. Alternatively, the free-time search may be conducted for each suitable location by iterating through the search process for each candidate location. (While this iteration is not reflected in the flowcharts, it will obvious to one of ordinary skill in the art how the logic depicted therein may be modified to support this alternative.)

Once a location is selected, as shown in Block 940, the context-sensitive search is performed for this location by invoking the processing of FIGS. 3-7, described above. The results are then returned (Block 950) to the invoking logic (which in preferred embodiments is Block 250 of FIG. 2).

FIGS. 10-11 represent the search process when the person scheduling the meeting has not pre-selected a specific location and has not selected a location from the recommendation process in FIG. 9 (and Block 1000 is therefore reached following a negative result at Block 910). Block 1000 begins the process by obtaining the list of meeting invitees whose in-person participation is required. A list of candidate locations is then created in Block 1010. In preferred embodiments, the candidate locations may be selected by compiling a list of (1) the office locations for each invitee whose in-person presence is required; (2) all locations for which calendar entries are already scheduled for those people, for the time frame in which the meeting is to be scheduled; and/or (3) locations central to these in-person participant locations. Thus, consideration is given to where the invitees will be on the day of the meeting, to increase the likelihood of finding a meeting time and location. Alternatively, the candidate locations may be selected in an implementation-specific manner (e.g., using a list of site-specific preferred locations or other criteria).

Block 1020 then chooses one of the candidate locations which has not yet been processed. Block 1030 performs the context-sensitive free-time search process for this candidate location, using the logic of FIGS. 3-7. The results of the search are then saved (Block 1040), and Block 1050 checks to see if there are any other candidate locations to be evaluated. If there are, then control returns to Block 1020 to select the next candidate. Otherwise, processing continues at Block 1060 where the results from evaluating each candidate location are combined, and processing then continues at Block 1100 of FIG. 11.

Block 1100 of FIG. 11 gets the sort preferences for sorting the search results. These preferences may be obtained by prompting the meeting scheduler, etc., as has been described with reference to Block 740 of FIG. 7. The results are then ordered accordingly (Block 1110), and returned (Block 1120) to the invoking logic (i.e., Block 250 of FIG. 2, in preferred embodiments) for display to the meeting scheduler.

FIG. 12 illustrates a sample GUI showing results of a search where multiple potential meeting times and locations were found. In this example, the meeting scheduler requested a meeting 60 minutes long, and did not specify a particular location. The four meeting invitees are John, Sally, Paul, and Mary. Four different types of meeting participation are possible in this example, ordered from in-person participation to "as needed" participation. Thus, four busy bars are shown for each invitee. Bold font has been used in the legend to the left of each busy bar to show which type of participation is allowable for this invitee.

According to preferred embodiments, the busy bars presented to the meeting scheduler represent the invitee's actual availability for various types of meeting participation, including the impact of the policy considerations, user preferences, and so forth that are applied during operation of FIGS. 4-6. (Note that while Block 420 of FIG. 4 selectively sets busy bars to "all-busy" for participation types that are not allowable for each invitee, this all-busy status pertains only to the search process and is not used in preferred embodiments if the busy bars are displayed.) The in-person busy bar is preferably displayed with the computed location-sensitive travel times, which were determined according to operation of Blocks 440-460 of FIG. 4. Showing each invitee's actual availability, in terms of free/busy-time segments, to the person scheduling the meeting may enable him/her to make a better decision when selecting among the potential meeting times/locations. Furthermore, this information may assist in making a decision as to whether re-doing the search with different criteria is advisable.

In the example of FIG. 12, the meeting scheduler has selected the 9:30 a.m. to 10:30 a.m. time segment on Apr. 9, 2002 in Bldg. 252, as shown in FIG. 12 by the highlighting at 1210. In the depicted representation, the topmost portion of the screen shows the potential meeting locations and times (see element 1230), while the lower portion shows per-invitee busy bars that reflect each invitee's availability for the location and time that have been selected above (and, notably, travel times for attending the meeting in this particular location).

In the depicted example, the in-person busy bar for John shows that John can attend this meeting at the selected location because he has free time between 9:30 a.m. and 10:30 a.m. and has 30 minutes available for traveling to the meeting (between 9:00 a.m. and 9:30 a.m.). John also has free time on this day between 1 p.m. and 5 p.m., after having a busy period between 10:30 a.m. and 12:30 p.m. and then traveling for 30 minutes (between 12:30 p.m. and 1:00 p.m.). John's presence is required in person (and therefore the displayed busy bar represents John's availability for in-person participation at the meeting in Bldg. 252, and also shows that he has free time available later in the day during which a meeting could alternatively be scheduled). Sally can attend in person between 1:30 p.m. and 3:30 p.m., or between 8:30 a.m. and 4:30 using a high-speed connection. Using other communication means, Sally is available up until 5:30 p.m. Paul and Mary have no time available for in-person participation on this particular day, but do have free time for communicating by telephone and for participating in an as-needed basis, as shown on those busy bars. According to the requirements placed by the meeting scheduler, participation for Sally, Paul, and Mary can be in-person or by high-speed connection; Paul is alternatively allowed to participate by telephone; and Mary is allowed to participate alternatively by telephone or by being available on an as-needed basis (e.g., via her pager). Thus, the context-sensitive free-time search of the present invention has determined that a 60-minute meeting which meets the requirements specified by the meeting scheduler, considering the required participation levels of each invitee and other factors specified as constraints, can be scheduled on April 9th between 9:30 a.m. and 10:30 a.m. (in RTP Building 252), as shown in the "Recommended meeting times and Locations" display of FIG. 12 (and as represented in FIG. 12 by the depicted busy bars); alternatively, a 60-minute meeting for these invitees and constraints can be scheduled on April 9th between 1 p.m. and 4:30 p.m. (in RTP Building 5). Other recommended meeting times, dates, and locations are also shown (indicating that the meeting scheduler entered a range of allowable dates). If the meeting scheduler selects one of the candidate time periods which exceeds the duration of the meeting, then a window or screen (or other similar means) will preferably be displayed to allow selecting a time period within the permissible range. "Back" and "Next" arrows have been provided at the bottom of the sample display to allow the meeting scheduler to view details of the busy bars for different days.

Upon clicking on the "Send Invitations" button 1220, invitations to each invitee will be programmatically generated and sent (e.g., by e-mail) to John, Sally, Paul, and Mary. As stated earlier, up to three invitations may be sent in preferred embodiments, including invitations that represent travel time to and/or from the meeting for the in-person participants. Preferably, the invitations also convey the allowable participation levels, on a per-invitee basis, that have been specified by the meeting scheduler. The recipient may have to manually adjust existing calendar entries and/or existing travel time segments.

As has been demonstrated, the present invention discloses advantageous techniques for performing free-time searches that exploit information of the type used with electronic calendars. Meetings can therefore be scheduled more easily than in the prior art, where due to the additional considerations that cannot be handled by current scheduler systems, there are many circumstances where meetings must be set up using old-fashioned, time-consuming manual methods. By leveraging advanced calendaring system information and using location, other context information, and preferences to provide a complete picture of a person's availability, as has been described herein, the present invention greatly increases the functionality (and therefore the value) of scheduling systems, resulting in an ability to schedule meetings with more accuracy and less rework.

While preferred embodiments have been described in terms of searching for time to schedule meetings, the disclosed techniques may be used advantageously for providing a general searching service in which the specific meaning and/or use of the information differs from that which has been described above.

U.S. Pat. No. 5,790,974, titled "Portable Calendaring Device Having Perceptual Agent Managing Calendar Entries", discloses a portable calendaring device for use by an individual. Calendar events can be added without consideration of travel time. Travel times are then computed for the purpose of setting reminder alarms and advising the person of schedule conflicts. This is done after the meeting has already been scheduled, and for only one person. The system is real-time oriented, and can calculate travel times based on global positioning satellite ("GPS") coordinates of where the person is currently and using real-time feeds of traffic information.

Commonly-assigned U.S. Pat. No. 6,338,081, which is titled "Message Handling Method, Message Handling Apparatus, and Memory Media for Storing a Message Handling Apparatus Controlling Program", describes a meeting scheduling agent which schedules meetings for multiple participants and consults conference room availability as part of the scheduling process.

Neither of these patents discloses the inventive techniques of the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code embodied therein.

The present invention has been described with reference to flowchart illustrations and/or flow diagrams of methods, apparatus (systems), and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus.

While preferred embodiments of the present invention have been described, additional variations and modifications in those embodiments may occur to those skilled in the art once they learn of the basic inventive concepts. Therefore, it is intended that the appended claims shall be construed to include all such variations and modifications as fall within the spirit and scope of the invention.

What is claimed:

1. A method of performing a free-time search of calendar data, comprising steps of:

determining, for each of a plurality of meeting invitees, each of at least one allowable participation type for which a meeting scheduler indicates that this meeting invitee is allowed to participate in a meeting to be scheduled, wherein at least one of the plurality of meeting invitees has at least two allowable participation types that each specify a different type of mandatory participation;

using calendar data comprising calendared events of the meeting invitees to programmatically build, for each of the plurality of meeting invitees, at least one busy bar representing calendared events of that meeting invitee, each of the at least one busy bars corresponding to one of the at least one allowable participation types of that meeting invitee, wherein:

each of the busy bars comprises a free-time segment for each time segment when the calendar data indicates that the meeting invitee is available for participation in the meeting in the corresponding allowable participation type and a busy-time segment for each time segment when the calendar data indicates that the meeting invitee is not available for participation in the meeting in the corresponding allowable participation type; and for at least one of the plurality of meeting invitees, the free-time segments and the busy-time segments in a first one of the busy bars built for that meeting invitee are different from the free-time segments and the busy-time segments in a second one of the busy bars built for that meeting invitee;

for all of the busy bars for which the corresponding allowable participation type is in-person participation, performing steps of:

programmatically changing all of the busy-time segments that represent travel time to free-time segments on the busy bar; and for each calendared event represented by an existing busy-time segment on the busy bar, computing a first travel time from a location of that calendared event to a location of the meeting and a second travel time from the location of the meeting to a location of the calendared event represented by a next-successive one of the existing busy-time segments, and programmatically adding a first new busy-time segment following the existing busy-time segment and a second new busy-time segment preceding the next calendared event, the first new busy-time segment representing the first travel time and the second new busy-time segment representing the second travel time;

adjusting at least one of the free-time segments in at least one of the busy bars based on one or more context-sensitive criteria which are applicable to this free-time search;

determining, from the busy bars, one or more free-time segments when each of the plurality of meeting invitees is available, in at least one of the at least one allowable participation types for that meeting invitee; and providing the determined free-time segments as a result of the free-time search.

2. The method according to claim 1, wherein the context-sensitive criteria comprise at least one of: user preferences of at least one of the plurality of meeting invitees; policy considerations; legal constraints; location constraints; technology constraints; and device constraints.

3. A method of programmatically scheduling a meeting for a plurality of meeting invitees, comprising steps of:
- determining, for each of the plurality of meeting invitees, each of at least one allowable participation type for which a meeting scheduler indicates that this meeting invitee is allowed to participate in the meeting, wherein at least one of the plurality of meeting invitees has at least two allowable participation types for the event, each of which specifies a different type of mandatory participation;
- using calendar data comprising calendared events of the meeting invitees to programmatically build, for each of the plurality of meeting invitees, at least one busy bar representing calendared events of that meeting invitee, each of the at least one busy bars corresponding to one of the at least one allowable participation types of that meeting invitee, wherein:
  - each of the busy bars comprises a free-time segment for each time segment when the calendar data indicates that the meeting invitee is available for participation in the meeting in the corresponding allowable participation type and a busy-time segment for each time segment when the calendar data indicates that the meeting invitee is not available for participation in the meeting in the corresponding allowable participation type; and
  - for at least one of the plurality of meeting invitees, the free-time segments and the busy-time segments in a first one of the busy bars built for that meeting invitee are different from the free-time segments and the busy-time segments in a second one of the busy bars built for that meeting invitee;
- for all of the busy bars for which the corresponding allowable participation type is in-person participation, performing steps of:
  - programmatically changing all of the busy-time segments that represent travel time to free-time segments on the busy bar; and
  - for each calendared event represented by an existing busy-time segment on the busy bar, computing a first travel time from a location of that calendared event to a location of the meeting and a second travel time from the location of the meeting to a location of the calendared event represented by a next-successive one of the existing busy-time segments, and programmatically adding a first new busy-time segment following the existing busy-time segment and a second new busy-time segment preceding the next calendared event, the first new busy-time segment representing the first travel time and the second new busy-time segment representing the second travel time;
- adjusting at least one of the free-time segments in at least one of the busy bars based on one or more context-sensitive criteria which are applicable to the meeting;
- determining, from the busy bars, one or more free-time segments when each of the plurality of meeting invitees is available, in at least one of the at least one allowable participation types for that meeting invitee; and
- providing the determined free-time segments as candidate times for scheduling the meeting.

4. The method according to claim 3, wherein the context-sensitive criteria comprise at least one of: user preferences of at least one of the plurality of meeting invitees; policy considerations; legal constraints; location constraints; technology constraints; and device constraints.

5. The method according to claim 3, wherein:
the adjusting step further comprises the steps of:
- analyzing the free-time segments in each of the busy bars for each of the plurality of meeting invitees; and
- marking each particular one of the analyzed free-time segments as a busy-time segment if the context-sensitive criteria indicate that this meeting invitee cannot participate in the meeting in the corresponding allowable participation type during this particular time segment.

6. The method according to claim 3, wherein the adjusting step further comprises, for all of the busy bars for which the corresponding allowable participation type is in-person participation, programmatically changing from a free-time segment to a busy-time segment each particular one of the free-time segments for which the context-sensitive criteria indicate that the meeting invitee for whom the busy bar was built cannot participate in the meeting by in-person participation during that particular time segment.

7. The method according to claim 3, further comprising the step of adjusting at least one of the first travel time and the second travel time, for at least one of the busy bars for which the corresponding allowable participation type is in-person participation, according to user preferences of the meeting invitee for whom the busy bar was built, prior to the determining step.

8. The method according to claim 3, wherein the computing step further comprises the steps of computing the first travel time based on a first distance between the location of the meeting and the location of the calendared event represented by the existing busy-time segment and computing the second travel time based on a second distance between the location of the meeting and the location of the calendared event represented by the next-successive one of the existing busy-time segments.

9. The method according to claim 3, wherein the computing step further comprises the step of retrieving the first travel time and the second travel time from a repository.

10. The method according to claim 3, wherein the computing step further comprises the step of consulting a travel time service.

* * * * *